US011809622B2

(12) United States Patent
Song et al.

(10) Patent No.: US 11,809,622 B2
(45) Date of Patent: Nov. 7, 2023

(54) ELECTRONIC DEVICE AND METHOD FOR EYE-TRACKING OF USER AND PROVIDING AUGMENTED REALITY SERVICE THEREOF

(71) Applicant: SAMSUNG ELECTRONICS CO., LTD., Suwon-si (KR)

(72) Inventors: Doukyoung Song, Suwon-si (KR); Hokeun Kwak, Suwon-si (KR); Jina Jeon, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 133 days.

(21) Appl. No.: 17/572,442

(22) Filed: Jan. 10, 2022

(65) Prior Publication Data

US 2022/0197378 A1 Jun. 23, 2022

Related U.S. Application Data

(63) Continuation of application No. PCT/KR2021/019536, filed on Dec. 21, 2021.

(30) Foreign Application Priority Data

Dec. 21, 2020 (KR) .................. 10-2020-0179278

(51) Int. Cl.
*G06F 3/01* (2006.01)
*G06T 11/00* (2006.01)
(Continued)

(52) U.S. Cl.
CPC ......... *G06F 3/013* (2013.01); *G02B 27/0093* (2013.01); *G02B 27/0101* (2013.01);
(Continued)

(58) Field of Classification Search
CPC ............ G02B 27/0093; G02B 27/0101; G02B 2027/014; G02B 2027/0138;
(Continued)

(56) References Cited

U.S. PATENT DOCUMENTS

2017/0102767 A1 4/2017 Kim et al.
2017/0160518 A1 6/2017 Lanman et al.
(Continued)

FOREIGN PATENT DOCUMENTS

CN 111010560 4/2020
KR 10-2017-0042877 4/2017
(Continued)

OTHER PUBLICATIONS

Search Report and Written Opinion dated Mar. 30, 2022 in counterpart International Patent Application No. PCT/KR2021/0019536.

*Primary Examiner* — Muhammad N Edun
(74) *Attorney, Agent, or Firm* — Nixon & Vanderhye, P.C.

(57) ABSTRACT

According to various embodiments of the disclosure, an electronic device includes: a frame; a glass module comprising a glass supported by the frame; a support rotatably connected to the frame; a display module comprising display circuitry configured to project an image to the glass module; a front camera disposed in at least one of the frame or the support configured to photograph the front of the frame; a light emitting unit comprising light-emitting circuitry configured to radiate light toward the rear of the frame; and an eye tracking camera disposed in the frame configured to photograph the rear of the frame and including a lens assembly including at least one lens, wherein the eye tracking camera is configured to form a field of view (FOV) to include both a left eye and a right eye of a user based on an object distance, which is a distance between the lens assembly and an object, being a first distance corresponding to a
(Continued)

distance between the lens assembly and the left eye and/or the right eye of the user wearing the electronic device, wherein an absolute value of a distortion value of the lens assembly is equal to or less than a threshold value capable of tracking a pupil movement of the left eye and the right eye with respect to light incident from a region of interest (ROI) within a certain range from an outermost portion to the inside among regions corresponding to the FOV.

20 Claims, 17 Drawing Sheets

(51) Int. Cl.
| | | |
|---|---|---|
| | *G06T 3/40* | (2006.01) |
| | *G02B 27/00* | (2006.01) |
| | *G02B 27/01* | (2006.01) |
| | *H04N 23/90* | (2023.01) |

(52) U.S. Cl.
CPC ............... G06T 3/40 (2013.01); G06T 11/00 (2013.01); H04N 23/90 (2023.01); *G02B 2027/014* (2013.01); *G02B 2027/0134* (2013.01); *G02B 2027/0138* (2013.01)

(58) Field of Classification Search
CPC ........ G02B 27/0172; G02B 2027/0134; G06F 3/013; G06F 3/011; G06T 11/00; G06T 3/40; H04N 23/90
See application file for complete search history.

(56) References Cited

U.S. PATENT DOCUMENTS

| | | |
|---|---|---|
| 2017/0192499 A1 | 7/2017 | Trail |
| 2017/0285337 A1 | 10/2017 | Wilson et al. |
| 2018/0275394 A1 | 9/2018 | Yeoh et al. |
| 2019/0287495 A1* | 9/2019 | Mathur .................. G06T 5/002 |
| 2020/0069178 A1 | 3/2020 | Goldberg et al. |
| 2020/0379214 A1 | 12/2020 | Lee et al. |
| 2021/0318558 A1* | 10/2021 | Tzvieli ............... G02B 27/0093 |

FOREIGN PATENT DOCUMENTS

| | | |
|---|---|---|
| KR | 10-1780669 | 9/2017 |
| KR | 10-2018-0131002 | 12/2018 |
| KR | 10-2020-0136297 | 12/2020 |

* cited by examiner

ELECTRONIC DEVICE AND METHOD FOR EYE-TRACKING OF USER AND PROVIDING AUGMENTED REALITY SERVICE THEREOF

CROSS-REFERENCE TO RELATED APPLICATIONS

This application is a continuation of International Application No. PCT/KR2021/019536 designating the United States, filed on Dec. 21, 2021, in the Korean Intellectual Property Receiving Office and claiming priority to Korean Patent Application No. 10-2020-0179278, filed on Dec. 21, 2020, in the Korean Intellectual Property Office, the disclosures of which are incorporated by reference herein in their entireties.

BACKGROUND

Field

The disclosure relates to an electronic device, and for example, to a wearable electronic device including a camera for implementing augmented reality (AR).

Description of Related Art

An electronic device may provide virtual reality (VR) that enables a user to have a real-like experience in a virtual world created by a computer. Further, the electronic device may provide augmented reality (AR) in which virtual information (or object) is added to the real world and mixed reality (MR) in which VR and AR is mixed. The electronic device may include a head up display for providing such VR and AR.

AR may refer to technology for expressing real reality recognized by a user by adding an element generated through computer graphic processing. For example, using AR technology, a virtual object including information related to an object may be added to the object existing in reality and be displayed together.

AR may be implemented through various devices. Typically, AR may be implemented through wearable electronic devices such as glasses-type wearable electronic devices and head mounted displays (HMDs).

In order to implement AR in the glasses-type wearable electronic device, an image may be displayed on a lens of glasses. By projecting light onto the lenses of the glasses, an image may be displayed on the lenses. For example, a projector with a very small size (e.g., micro projector, pico projector) may be used. Examples of such a projector may include a laser scanning display (LSD), a raster/retinal scanning display (RSD), a digital micro-mirror display (DMD), and a liquid crystal on silicon (LCoS). Further, an image may be displayed on the lens using a transparent display.

To implement AR, an electronic device may include a plurality of cameras. For example, each of a camera for photographing a front image and a camera for photographing a rear image in order to track a user's pupil movement may be provided, and for example, in a case of a camera for tracking the user's pupil movement, a plurality of cameras may be required to photograph each of both eyes.

As described above, when the number of cameras increases, a volume and weight of the electronic device increase, which may cause a problem in that the wearing comfort of the electronic device decreases and a unit price of the electronic device increases. Further, there may be a problem in that a running time reduces due to power required to drive the plurality of cameras. In addition, there may be a problem in that a space for disposing a plurality of cameras is wasted. In order to integrate the cameras, when components such as prisms or mirrors are added, similar problems may arise in terms of space and weight.

SUMMARY

Embodiments of the disclosure provide an electronic device capable of addressing a problem caused by an increase in the number of cameras by integrating each existing camera for performing different functions.

According to various example embodiments of the disclosure, an electronic device includes: a frame; a glass module comprising at least one glass supported by the frame; a support rotatably connected to the frame; a display module comprising display circuitry configured to project an image to the glass module; a front camera disposed in at least one of the frame or the support to photograph a front of the frame; a light emitting unit comprising light emitting circuitry configured to radiate light toward a rear of the frame; and an eye tracking camera disposed in the frame and configured to photograph the rear of the frame, the eye tracking camera including a lens assembly including at least one lens, wherein the eye tracking camera is configured to form a field of view (FOV) to include both a left eye and a right eye of a user based on an object distance, which is a distance between the lens assembly and an object, being a first distance corresponding to a distance between the lens assembly and the left eye and/or the right eye of the user wearing the electronic device, wherein an absolute value of a distortion value of the lens assembly is equal to or less than a threshold value capable of tracking a pupil movement of the left eye and the right eye with respect to light incident from a region of interest within a certain range from an outermost portion to the inside among regions corresponding to the viewing angle.

According to various example embodiments of the disclosure, a method of tracking gaze in an electronic device and outputting an AR image includes: generating front image information by receiving light incident from a front; and generating binocular image information including image information of a left eye and image information of a right eye by receiving light incident from directions of a left eye and right eye using an eye tracking camera, wherein the eye tracking camera forms a field of view (FOV) including all the left eye and right eye based on an object distance between an object and the lens assembly included therein being a distance corresponding to a distance between the left eye and/or the right eye of the user wearing the electronic device, and an absolute value of a distortion value of the lens assembly is equal to or less than a threshold value capable of tracking a pupil movement of the left eye and the right eye with respect to light incident from a region of interest within a certain range from an outermost portion to the inside among regions corresponding to the viewing angle.

According to various example embodiments, by reducing the number of cameras included in an electronic device, a unit price of the electronic device can be reduced, a weight and volume of the electronic device can be reduced, and a running time of the electronic device can be increased.

Further, various effects directly or indirectly identified through this disclosure can be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
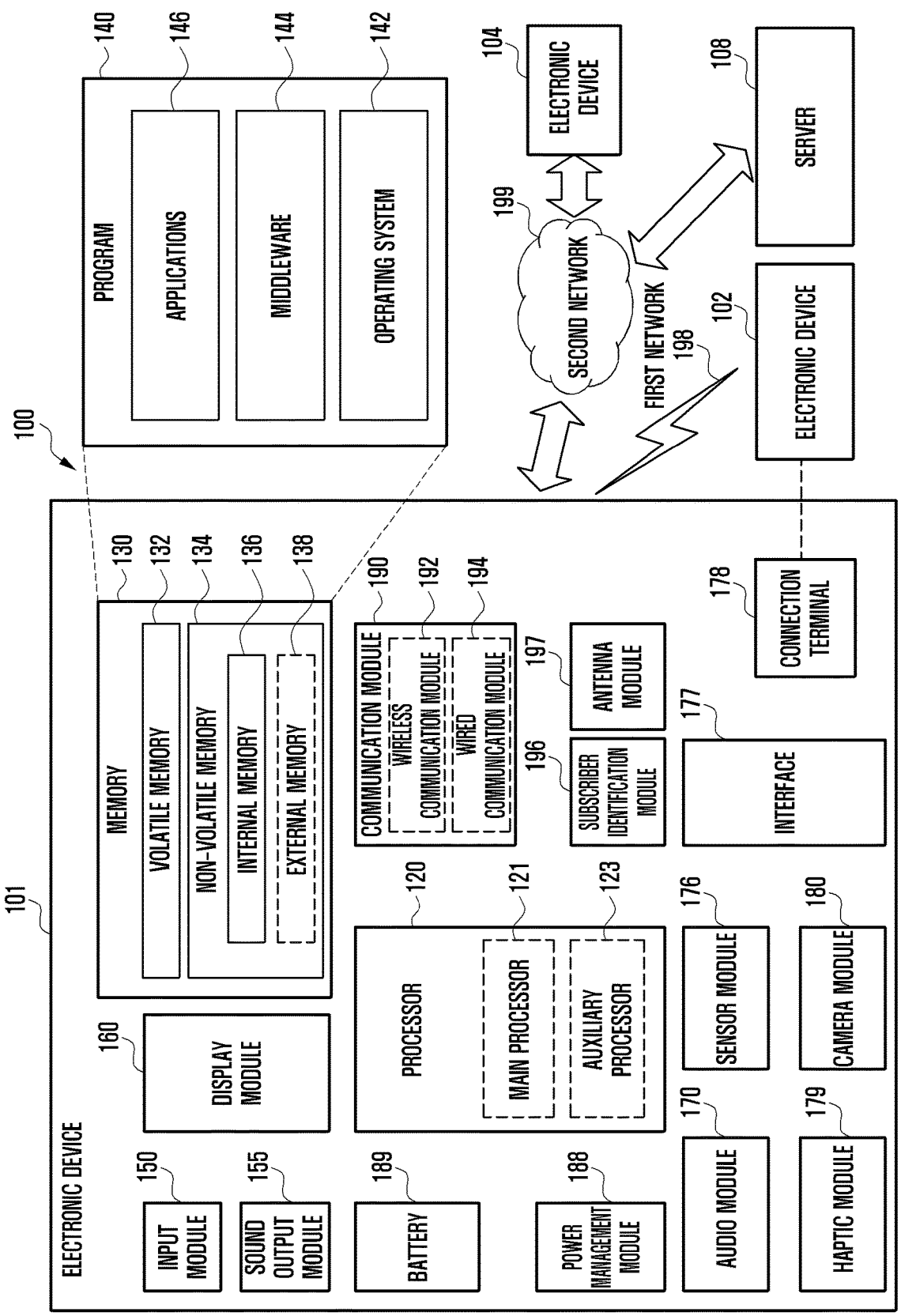
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1 module 150, a sound output 1 module 155, a display 1 module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the 11 connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1 module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input 1 module 150 may receive a command or data to be used by another component (e.g., the processor 120) of the electronic device 101, from the outside (e.g., a user) of the electronic device 101. The input 1 module 150 may include, for example, a microphone, a mouse, a keyboard, a key (e.g., a button), or a digital pen (e.g., a stylus pen).

The sound output 1 module 155 may output sound signals to the outside of the electronic device 101. The sound output 1 module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1 module 160 may visually provide information to the outside (e.g., a user) of the electronic device 101. The display 1 module 160 may include, for example, a display, a hologram device, or a projector and control circuitry to control a corresponding one of the display, hologram device, and projector. According to an embodiment, the display 1 module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1 module 150, or output the sound via the sound output 1 module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 2A:
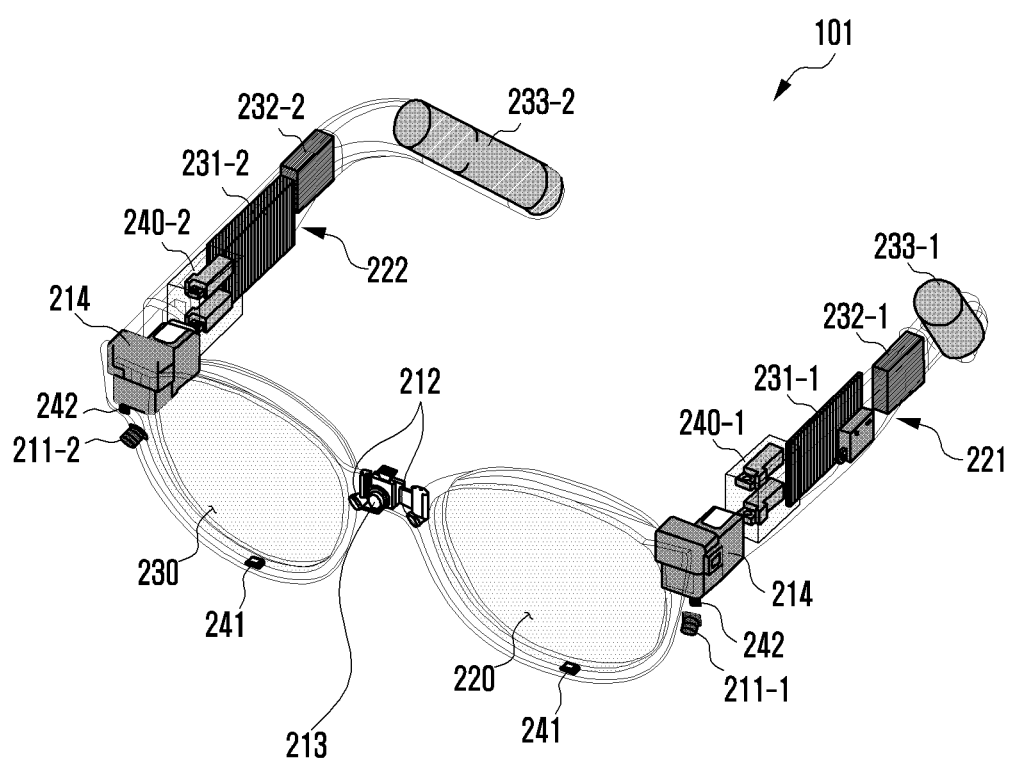
FIG. 2A is a diagram illustrating an example configuration of an electronic device including a plurality of cameras according to various embodiments.
Figure 2B:
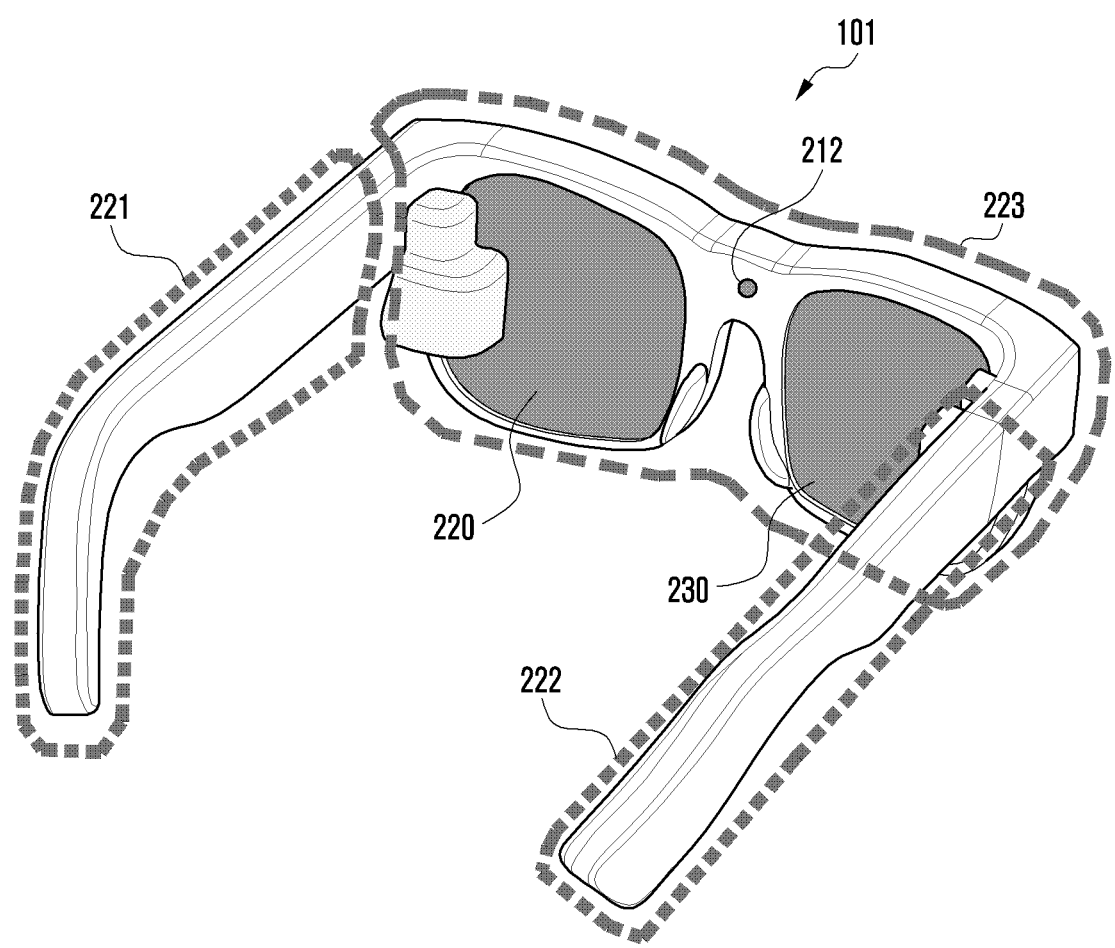
FIG. 2B is a diagram illustrating a rear surface of an electronic device according to various embodiments.

FIG. 2A is a diagram illustrating an example configuration of an electronic device (e.g., the electronic device 101 of FIG. 1) including a plurality of cameras according to various embodiments. FIG. 2B is a diagram illustrating a rear surface of an electronic device according to various embodiments, and an internal configuration thereof may be the same as a configuration illustrated in FIG. 2A.

In various embodiments, an electronic device 101 may be worn on a user's head to provide an image related to an augmented reality (AR) service to the user. According to an embodiment, the electronic device 101 may provide an AR service that outputs at least one virtual object to be superimposed in a region determined as the user's field of view (FoV). For example, the region determined as the user's FoV is a region determined to be recognizable by the user wearing the electronic device 101 through the electronic device 101, and may be a region including all or at least a portion of the display module (e.g., the display module 160 of FIG. 1) of the electronic device 101. According to an embodiment, the electronic device 101 may include a plurality of glasses (e.g., first glass 220 and/or second glass 230) corresponding to both eyes (e.g., left eye and/or right eye), respectively of the user. The plurality of glasses may include at least a portion of a display module (e.g., a first display module 351 and/or a second display module 353 of FIG. 3). For example, the first glass 220 corresponding to the user's left eye may include a first display module 351, and the second glass 230 corresponding to the user's right eye may include a second display module 353. For example, the electronic device 101 may be configured in the form of at least one of glasses, goggles, a helmet, or a hat, but the disclosure is not limited thereto.

Referring to FIG. 2A, the electronic device 101 according to an embodiment may include a display module (e.g., including display circuitry) 214 (e.g., the display module 160 of FIG. 1), a camera module (e.g., including a camera) (e.g., the camera module 180 of FIG. 1), an audio module (e.g., including audio circuitry) (e.g., the audio module 170 of FIG. 1), a first support 221, and/or a second support 222. According to an embodiment, the display module 160 may include a first display (e.g., the first glass 220) (e.g., the first display module 351 of FIG. 3) and/or a second display (e.g., the second glass 230) (e.g., the second display module 353 of FIG. 3). According to an embodiment, the at least one camera may include a front camera 213 for photographing an image corresponding to the user's FoV and/or measuring a distance to an object, an eye tracking camera 212 for identifying a direction of the user's gaze, and/or gesture cameras 211-1 and 211-2 for recognizing a certain space. For example, the front camera 213 may photograph the front, that is, a front direction of the electronic device 101, and the eye tracking camera 212 may photograph the rear, that is, a direction opposite to a photographing direction of the front camera 213. For example, the eye tracking camera 212 may at least partially photograph both eyes of the user including left and right eyes of the user who wears the electronic device 101, which exists in the rear of the electronic device 101. According to an embodiment, the first support 221 and/or the second support 222 may include printed circuit boards (PCBs) 231-1 and 231-2, speakers 232-1 and 232-2, and/or batteries 233-1 and 233-2, respectively.

According to an embodiment, the display module 160 (e.g., the display module 214 of FIG. 2A) may be disposed in a frame (e.g., the frame 223 of FIG. 2B) of the electronic device 101, and include a condensing lens (not illustrated) and/or a transparent waveguide (not illustrated) in the glass (e.g., the first glass 220 and the second glass 230). For example, the transparent waveguide may be positioned at least partially in a portion of the glass. According to an embodiment, light emitted from the display module 160 may be incident on one end of the glass through the first glass 220 and the second glass 230, and the incident light may be transmitted to the user through a waveguide formed in the glass. The waveguide may be made of glass, plastic, or polymer, and include a nano pattern, for example, a polygonal or curved grating structure, formed at one surface of the inside or the outside. According to an embodiment, the incident light may be propagated or reflected inside the waveguide by a nanopattern to be provided to the user. According to an embodiment, the waveguide may include at least one of at least one diffractive element (e.g., diffractive optical element (DOE), holographic optical element (HOE)) or a reflective element (e.g., reflective mirror). According to an embodiment, the waveguide may guide display light emitted from the light source to the user's eyes using at least one diffractive element or a reflective element.

Referring to FIG. 2A, the first support 221 and/or the second support 222 may include printed circuit boards 231-1 and 231-2 for transmitting electrical signals to respective components of the electronic device 101, speakers 232-1 and 232-2 for outputting an audio signal, batteries 233-1 and 233-2, and/or hinge portions 240-1 and 240-2 for at least partially coupling to a frame 223 of the electronic device 101. According to an embodiment, the speakers 232-1 and 232-2 may include a first speaker 232-1 for delivering an audio signal to the user's left ear and a second speaker 232-2 for delivering an audio signal to the user's right ear. The speakers 232-1 and 232-2 may be included in the audio module 170 of FIG. 1. According to an embodiment, the electronic device 101 may be provided with a plurality of batteries 233-1 and 233-2, and supply power to the printed circuit boards 231-1 and 231-2 through the power management module (e.g., the power management module 188 of FIG. 1).

Referring to FIG. 2A, the electronic device 101 may include a microphone 241 for receiving a user's voice and/or ambient sounds. For example, the microphone 241 may be included in the audio module 170 of FIG. 1. The electronic device 101 may include at least one light emitting device (illumination LED) 242 for increasing accuracy of at least one camera (e.g., the front camera 213, the eye tracking camera 212, and/or the recognition cameras 211-1 and 211-2). For example, the light emitting device 242 may be used as an auxiliary means for increasing accuracy when photographing the user's pupil with the eye tracking camera 212, and the light emitting device 242 may use an infrared light emitting diode (IR LED) of an infrared wavelength rather than a visible light wavelength. For another example, when a user's gesture is photographed with the recognition cameras 211-1 and 211-2, if it is not easy to detect a subject to be photographed due to a dark environment or mixing and/or reflected light of various light sources, the light emitting device 242 may be used as an auxiliary means.

Referring to FIGS. 2A and 2B, the electronic device 101 according to an embodiment may include a frame 223 and a support (e.g., the first support 221 and/or the second support 222), and the frame 223 and the supports 221 and 222 may be in an operatively connected state. For example, the frame 223 and the supports 221 and 222 may be operatively connected through the hinge portions 240-1 and 240-2. The frame 223 may be at least partially mounted on the user's nose, and include a display module 160 and a camera module (e.g., the camera module 180 of FIG. 1). The supports 221 and 222 may include a support member mounted on the user's ear, and include a first support 221 mounted on a left ear and/or a second support 222 mounted on a right ear. According to an embodiment, the first support 221 or the second support 222 may include at least partially printed circuit boards 231-1 and 231-2, speakers 232-1 and 232-2, and/or batteries 233-1 and 233-2 (e.g., the battery 189 of FIG. 1, the first battery 333 and/or the second battery 343 of FIG. 3). The battery may be electrically connected to a power management module (e.g., the power management module 188 of FIG. 1).

According to an embodiment, the display module 160 may include first glass 220 and/or second glass 230 and provide visual information to the user through the first glass 220 and the second glass 230. The electronic device 101 may include first glass 220 corresponding to the left eye and/or second glass 230 corresponding to the right eye. According to an embodiment, the display module 160 may include a display panel and/or a lens (e.g., glass). For example, the display panel may include a transparent material such as glass or plastic.

According to an embodiment, the display module 160 may be formed with a transparent element, and the user may recognize an actual space of a rear surface of the display module 160 through the display module 160. The display module 160 may display a virtual object on at least a portion of the transparent element so that the user views a virtual object as being added to at least a portion of a real space. According to various embodiments, the display module 160 may output and display an AR image including a virtual object. The first glass 220 and/or the second glass 230 included in the display module 160 may include a plurality of glasses corresponding to each of both eyes (e.g., left eye and/or right eye) of the user.

According to an embodiment, the electronic device 101 may include a virtual reality (VR) device. When the electronic device 101 is a VR device, the first glass 220 may include a first display module 351, and the second glass 230 may include a second display module 353 (refer to FIG. 3).

According to an embodiment, the virtual object output through the display module 160 may include information related to an application program executed in the electronic device 101 and/or information related to an external object positioned at a real space corresponding to a region determined as the user's FoV. For example, the electronic device 101 may identify an external object included in at least a portion corresponding to the region determined as the user's FoV among image information related to the real space obtained through the camera (e.g., the front camera 213) thereof. The electronic device 101 may output (or display) a virtual object related to an external object identified in at least a portion through a region determined as the user's FoV among display regions of the electronic device 101. The external object may include an object existing in a real space. According to various embodiments, the display region in which the electronic device 101 displays a virtual object may include a portion (e.g., at least a portion of the display panel) of the display module (e.g., the first display module 351 or the second display module 353). According to an embodiment, the display region may be a region corresponding to at least a portion of the first glass 220 and/or the second glass 230.

According to an embodiment, the electronic device 101 may include a front camera 213 (e.g., RGB camera) for photographing an image corresponding to the user's FoV and/or measuring a distance to an object, an eye tracking camera 212 for identifying the user's gaze direction, and/or recognition cameras 211-1 and 211-2 (e.g., gesture camera) for recognizing a certain space. According to an embodiment, the electronic device 101 may measure a distance to an object positioned in a front direction of the electronic device 101 using the front camera 213. According to an embodiment, in the electronic device 101, a plurality of eye tracking cameras 212 may be disposed to correspond to both eyes of the user. For example, the eye tracking camera 212 may photograph a direction opposite to a photographing direction of the front camera 213. The eye tracking camera 212 may detect the user's gaze direction (e.g., pupil movement). For example, the eye tracking camera 212 may photograph both the user's left eye and the user's right eye to track gaze directions of each of both eyes. According to an embodiment, the electronic device 101 may detect a user gesture within a preconfigured (specified) distance (e.g., certain space) using the recognition cameras 211-1 and 211-2. For example, the recognition cameras 211-1 and 211-2 may be configured in the plural, and be disposed at both sides of the electronic device 101. The electronic device 101 may detect an eye corresponding to a primary eye and/or an auxiliary eye among the left eye and/or the right eye using at least one camera. For example, the electronic device 101 may detect an eye corresponding to the primary eye and/or the auxiliary eye based on the user's gaze direction with respect to the external object and/or the virtual object.

According to an embodiment, the front camera 213 may include a high resolution camera such as a high resolution (HR) camera and/or a photo video (PV) camera. According to an embodiment, the eye tracking camera 212 may detect the user's pupil to track the gaze direction, and be utilized to move the center of a virtual image corresponding to the gaze direction. According to an embodiment, the recognition cameras 211-1 and 211-2 may be used for detecting a user's hand (gesture) and/or recognizing a space, and include a global shutter (GS) camera. For example, in order to detect and track a quick hand gesture and/or a minute movement such as a finger, the recognition cameras 211-1 and 211-2 may include a GS camera with less screen drag.

According to an embodiment, the electronic device 101 may display together a virtual object related to an AR service based on image information related to a real space obtained through a camera (e.g., the camera module 180 of FIG. 1) thereof. According to an embodiment, the electronic device 101 may display the virtual object based on a display module (e.g., the first display module 351 corresponding to the left eye and/or the second display module 353 corresponding to the right eye) disposed corresponding to both eyes of the user. According to an embodiment, the electronic device 101 may display the virtual object based on preconfigured (specified) configuration information (e.g., resolution, frame rate, brightness, and/or display region).

According to an embodiment, the electronic device 101 may operate each of the first display panel included in the first glass 220 and the second display panel included in the second glass 230 as independent components. For example, the electronic device 101 may determine a display performance of the first display panel based on first configuration information, and determine a display performance of the second display panel based on the second configuration information.

The number and position of at least one camera (e.g., the front camera 213, the eye tracking camera 212, and/or the recognition cameras 211-1 and 211-2) included in the electronic device 101 illustrated in FIGS. 2A and 2B may not be limited. For example, the number and position of at least one camera (e.g., the front camera 213, the eye tracking camera 212, and/or the recognition cameras 211-1 and 211-2) may vary based on a form (e.g., shape or size) of the electronic device 101. According to various embodiments, there is one eye tracking camera 212, and the eye tracking camera 212 may photograph simultaneously or separately each of both eyes.

Figure 3:
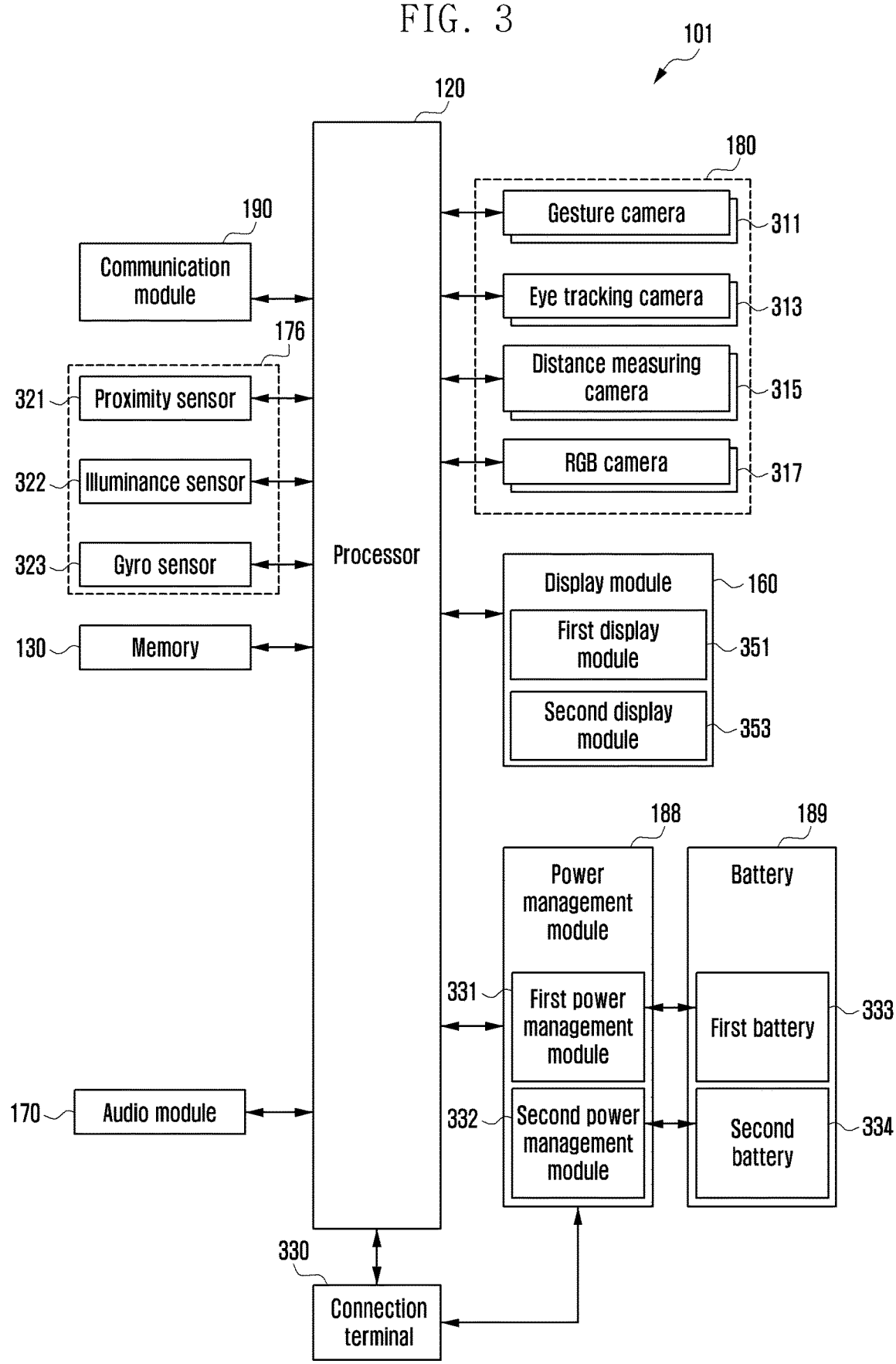
FIG. 3 is a block diagram illustrating an example configuration of an electronic device for tracking a user's gaze and providing an AR environment according to various embodiments.

FIG. 3 is a block diagram illustrating an example configuration of an electronic device 101 (e.g., the electronic device 101 of FIG. 1) for tracking a user's gaze and providing an AR environment according to various embodiments.

Referring to FIG. 3, the electronic device 101 may include a processor (e.g., including processing circuitry) 120 (e.g., the processor 120 of FIG. 1), a memory 130 (e.g., the memory 130 of FIG. 1), a display module (e.g., including display circuitry) 160 (e.g., the display module 160 of FIG. 1), an audio module (e.g., including audio circuitry) 170 (e.g., the audio module 170 of FIG. 1), a sensor module (e.g., including at least one sensor) 176 (e.g., the sensor module 176 of FIG. 1), a camera module (e.g., including a camera) 180 (e.g., the camera module 180 of FIG. 1), a power management module (e.g., including power management circuitry) 188 (e.g., the power management module 188 of FIG. 1), a battery 189 (e.g., the battery 189 of FIG. 1), and/or a communication module (e.g., including communication circuitry) 190 (e.g., the communication module 190 of FIG. 1). According to an embodiment, the electronic device 101 may be connected to an external electronic device (e.g., the electronic device 102 of FIG. 1) through a connection terminal 330 (e.g., USB TYPE-C) (e.g., the connection terminal 178 of FIG. 1). For example, the power management module 188 of the electronic device 101 may receive power from an external electronic device through the connection terminal 330 to charge the battery 189. As another example, the processor 120 of the electronic device 101 may perform power line communication with an external electronic device through the connection terminal 330. According to an embodiment, the electronic device 101 may include a frame (e.g., the frame 223 of FIG. 2B) and a support (e.g., the first support 221 and/or the second support 222 of FIG. 2B). According to an embodiment, the components of the electronic device 101 may be disposed in the frame 223 or the supports 221 and 222.

According to an embodiment, the processor 120 may include various processing circuitry and execute a program (e.g., the program 140 of FIG. 1) stored in the memory 130 to control at least one other component (e.g., hardware or software component) and perform various data processing or operations. According to an embodiment, the processor 120 may provide an AR service to the user. The processor 120 may output at least one virtual object through the display module 160 so that at least one virtual object is additionally displayed in a real space corresponding to the FoV of the user wearing the electronic device 101.

According to an embodiment, the display module 160 of the electronic device 101 may include various display circuitry and/or display elements including, for example, at least one glass (e.g., first glass (e.g., the first glass 220 of FIG. 2A) and/or second glass (e.g., the second glass 230 of FIG. 2A)). According to an embodiment, the first glass 220 may include at least a portion of the first display module 351, and the second glass 230 may include at least a portion of the second display module 353. For example, the first display module 351 and/or the second display module 353 may each include a display panel. The display panel may be configured with a transparent element so that a user may recognize an actual space through the display module 160. The display module 160 may display at least one virtual object on at least a portion of the display panel so that a user wearing the electronic device 101 may view that a virtual object is added to the real space. For example, the user's FoV may include an angle and/or a range in which the user may recognize an object. According to an embodiment, the display module 160 may include a first display module 351 corresponding to the left eye and/or a second display module 353 corresponding to the right eye among both eyes of the user. According to an embodiment, the processor 120 may load configuration information (e.g., resolution, frame rate, size of a display region, and/or sharpness) related to a performance of the display module 160 from the memory 130 and adjust a performance of the display module 160 based on the configuration information. According to an embodiment, configuration information on each display panel included in the display module 160 may be individually determined. For example, a first display panel corresponding to the left eye may be configured based on the first configuration information, and a second display panel corresponding to the right eye may be configured based on the second configuration information. According to an embodiment, the configuration information may configure differently at least a portion of one display panel included in the display module 160. For example, the electronic device 101 may differently configure at least one of a resolution, a frame rate, and/or sharpness of the display module 160. According to an embodiment, by at least partially changing a configuration of the display module 160, the electronic device 101 may reduce power consumption.

According to an embodiment, the audio module 170 may include various audio circuitry and convert a sound into an electric signal or, conversely, convert an electric signal into a sound based on the control of the processor 120. For example, the audio module 170 may include the speakers 232-1 and 232-2 of FIG. 2A and/or the microphone 241 of FIG. 2A.

According to an embodiment, the sensor module 176 of the electronic device 101 may include various sensors including, for example, a proximity sensor 321, an illuminance sensor 322, and/or a gyro sensor 323. According to an embodiment, the proximity sensor 321 may detect an object adjacent to the electronic device 101. The illuminance sensor 322 may measure a degree of brightness around the electronic device 101. According to an embodiment, the processor 120 may identify a brightness level around the electronic device 101 using the illuminance sensor 322 and change brightness related configuration information of the display module 160 based on the brightness level. For example, when peripheral brightness is brighter than preconfigured (specified) brightness, in order to increase the user's visibility, the processor 120 may configure a brightness level of the display module 160 to be higher. According to an embodiment, the gyro sensor 323 may detect a posture and/or a position of the electronic device 101. For example, the gyro sensor 323 may detect whether the electronic device 101 is properly worn on the user's head. As another example, the gyro sensor 323 may detect the electronic device 101 or a motion of a user wearing the electronic device 101.

According to an embodiment, the electronic device 101 may perform wireless communication with another electronic device (e.g., the electronic devices 102 and 104 of FIG. 1) through a communication module 190 (e.g., wireless communication circuit). For example, the electronic device 101 may perform wireless communication with a mobile electronic device (e.g., smartphone) and exchange instructions and/or data with each other. According to an embodiment, the electronic device 101 may be at least partially controlled by another external electronic device (e.g., mobile electronic device). For example, the electronic device 101 may perform at least one function under the control of another external electronic device.

According to various embodiments, the electronic device 101 may change at least a portion of the configuration of the display panel based on the control of another electronic device (e.g., the electronic devices 102 and 104 of FIG. 1) connected wirelessly and/or by wire. According to an embodiment, the electronic device 101 may transmit primary eye/auxiliary eye related information (e.g., information on a distance to an object positioned at real space, user's eye tracking information, or user's gesture information) obtained through a camera (e.g., the camera module 180 of FIG. 1) thereof to another electronic device. The other electronic device may transmit, to the electronic device 101, configuration information on the display panel included in glasses (e.g., the first glass 220 and/or the second glass 230) corresponding to the detected primary eye or auxiliary eye based on the primary eye/auxiliary eye related information received from the electronic device 101. The electronic device 101 may change at least some of configurations of the display panel based on configuration information of the display panel received from the other electronic device. For example, the configuration of the display panel may be changed to lower a quality of the display panel, and at least a portion of the configurations may be changed not to be felt by the user. According to an embodiment, the electronic device 101 may reduce a resolution of the display panel, decrease a frame rate, or adjust a size and/or a position of the display region of the display panel.

According to an embodiment, the camera module 180 of the electronic device 101 may include at least one camera, including, for example, a gesture camera 311, an eye tracking camera 313, a distance measuring camera (depth camera) 315, and/or an RGB camera 317. According to an embodiment, the gesture camera 311 may detect a user's movement. The recognition cameras 211-1 and 211-2 of FIG. 2A may include a gesture camera 311. For example, at least one gesture camera 311 may be disposed in the electronic device 101 and detect a user's hand movement within a preconfigured (specified) distance. The gesture camera 311 may include a simultaneous localization and mapping camera (SLAM) for recognizing information (e.g., position and/or direction) related to a peripheral space of the electronic device 101. A gesture recognition region of the gesture camera 311 may be configured based on a photographing range of the gesture camera 311. According to an embodiment, the eye tracking camera 313 (e.g., the eye tracking camera 212 of FIG. 2A) may track a movement of the user's left eye and right eye. According to an embodiment, the processor 120 may identify a gaze direction of the left eye and a gaze direction of the right eye using the eye tracking camera 313. For example, the eye tracking camera 313 may photograph both the user's left eye and right eye to track a gaze directions of each of both eyes. According to an embodiment, the processor 120 may determine a primary eye and an auxiliary eye based on the gaze direction of the left eye and the gaze direction of the right eye. According to an embodiment, the distance measuring camera 315 may measure a distance to an object positioned at the front of the electronic device 101. The front camera 213 of FIG. 2A may include a distance measuring camera 315. The distance measuring camera 315 may include a time of flight (TOF) camera and/or a depth camera. According to an embodiment, the distance measuring camera 315 may photograph a front direction of the electronic device 101, and the eye tracking camera 313 may photograph a direction opposite to a photographing direction of the distance measuring camera 315. According to an embodiment, the electronic device 101 may measure a distance to an object using the distance measuring camera 315, and change the configuration of the display panel when the distance is equal to or greater than a threshold value. For example, when the distance to the object is close to equal to or less than a threshold value, the electronic device 101 may maintain a display performance of the display panel. According to an embodiment, the electronic device 101 may recognize one of objects positioned in a gaze direction (e.g., FOV) in which the user views with the eye tracking camera 313, and calculate a distance to the object through the depth camera or measure the distance to the object through the TOF camera. According to an embodiment, the red green blue (RGB) camera 317 may detect color related information of an object and/or information on a distance to the object. According to an embodiment, the electronic device 101 may include one type of camera by integrating the distance measuring camera 315 and the RGB camera 317. For example, the front camera 213 of FIG. 2A may include a distance measuring camera 315 and/or an RGB camera 317. According to an embodiment, the gesture camera 311, the eye tracking camera 313, the distance measuring camera 315, and/or the RGB camera 317 included in the camera module 180 may be respectively included in the electronic device 101 or a part thereof may be implemented into an integrated camera. For example, the distance measuring camera 315 and the RGB camera 317 may be implemented into one integrated camera.

According to an embodiment, the power management module 188 may include various power management circuitry and manage power supplied to the electronic device 101. The power management module 188 may include a plurality of power management modules (e.g., a first power management module 331 and a second power management module 332). At least a portion of the first power management module 331 or the second power management module 332 may be directly connected to the processor 120 to supply power. At least a portion of the first power management module 331 or the second power management module 332 may receive power from an external electronic device through the connection terminal 330 (e.g., TYPE-C) to charge the battery 189 or may supply power to other components of the electronic device 101. According to an embodiment, the electronic device 101 may receive power from an external electronic device through a wireless charging method to charge the battery 189. According to an embodiment, the power management module 188 may be electrically connected to components (e.g., the memory 130, the display module 160, the audio module 170, the sensor module 176, and the camera module 180, and/or the communication module 190) of the electronic device 101. For example, the power management module 188 may provide power from the battery 189 to components of the electronic device 101 based on the control of the processor 120. According to an embodiment, the electronic device 101 may receive power from a first battery 333 through the first power management module 331, and receive power from a second battery 334 through the second power management module 332. According to an embodiment, by at least partially changing the configuration of the display module 160 based on information obtained using the at least one camera 311, 313, 315, and 317 included in the camera module 180, the processor 120 may manage power consumption.

According to an embodiment, the battery 189 may be charged by receiving power or discharged by providing power under the control of the power management module 188. According to an embodiment, the battery 189 may include a plurality of batteries (e.g., the first battery 333 and the second battery 343). For example, the plurality of batteries (e.g., the first battery 333 and the second battery 343) may be disposed in the frame 223 and the support (e.g., the first support 221, and/or the second support 222). According to an embodiment, the first battery 333 may be disposed in the first support 221, and the second battery 343 may be disposed in the second support 222.

According to various embodiments, the electronic device 101 may include a first camera (e.g., the distance measuring camera 315 of FIG. 3) for photographing the front thereof, a second camera (e.g., the eye tracking camera 313 of FIG. 3) for photographing a direction opposite to a photographing direction of the first camera in order to identify gaze directions of the left eye and the right eyes of the user, a first display panel (e.g., the first display module 351 of FIG. 3) corresponding to the left eye, a second display panel (e.g., the second display module 353 of FIG. 3) corresponding to the right eye, a memory 130, and a processor 120 operatively connected to the first camera 315, the second camera 313, the first display panel, the second display panel, and the memory 130. The processor 120 may identify a primary eye and/or an auxiliary eye among the left eye and the right eye, and change a configuration of a display panel corresponding to the identified auxiliary eye among the first display panel and the second display panel to be at least partially different from that of the display panel corresponding to the identified primary eye.

According to an embodiment, the processor 120 may identify gaze directions of the left eye and the right eye using at least one of the first camera 315 and the second camera 313, and identify the primary eye and the auxiliary eye among the left eye and the right eye based on the identified gaze direction.

According to an embodiment, the processor 120 may measure a distance to the object using the first camera 315, and when the measured distance exceeds a threshold value, the processor 120 may identify a gaze direction of the user's left eye and right eye using the second camera 313.

According to an embodiment, the electronic device 101 may further include an illuminance sensor (e.g., the illuminance sensor 322 of FIG. 3) for detecting peripheral brightness, and the processor 120 may identify whether the measured brightness value is less than or equal to a threshold value using the illuminance sensor 322, and if the measured brightness value is less than or equal to a threshold value, the processor 120 may adjust to be low the resolution of the display panel corresponding to the auxiliary eye.

According to an embodiment, the processor 120 may identify a movement of an object in which the user gazes based on the gaze direction, identify whether the movement of the object exceeds a preconfigured (specified) reference value, and if the movement of the object exceeds a preconfigured (specified) reference value, the processor 120 may adjust to be low a frame rate of the display panel corresponding to the auxiliary eye.

According to an embodiment, the processor 120 may adjust the resolution to be low based on a preconfigured (specified) time interval and adjust the frame rate to be low based on the preconfigured (specified) time interval.

According to an embodiment, the processor 120 may identify a movement of the left eye and the right eye, identify whether the eye movement exceeds a preconfigured (specified) reference value, and if the eye movement exceeds a preconfigured (specified) reference value, the processor 120 may adjust to be small a display region of the display panel corresponding to the auxiliary eye.

According to an embodiment, the processor 120 may generate at least partially a virtual object in the first display panel and the second display panel, identify a gaze direction of the left eye and a gaze direction of the right eye of the user gazing the object by passing through the virtual object using the second camera, and identify an auxiliary eye among the left eye and the right eye based on the identified gaze direction.

According to an embodiment, the electronic device 101 may further include a third camera (e.g., the gesture camera 311 of FIG. 3) for detecting a user's gesture, and the processor 120 may detect a position of the user's hand that has generated an arbitrary circle using the third camera, identify a gaze direction of the left eye and a gaze direction of the right eye of the user who gazes the object while passing through the circle using the second camera, and identify an auxiliary eye among the left eye and the right eye based on the identified gaze direction.

According to an embodiment, the processor 120 may identify the left eye corresponding to the auxiliary eye and the right eye corresponding to the primary eye, and identify whether the primary eye is changed based on the gaze direction of the left eye and the gaze direction of the right eye, and when it is identified that the primary eye is changed to the left eye, the processor 120 may change at least some configurations of a display panel corresponding to the right eye changed to the auxiliary eye.

According to an embodiment, when it is identified that the primary eye is changed to the left eye, the processor 120 may restore a display performance of the display panel corresponding to the left eye changed to the primary eye to an initial configuration.

According to an embodiment, the processor 120 may measure a distance to the object using the first camera 315 and change at least some of configurations of the display panel corresponding to the auxiliary eye when the measured distance exceeds a threshold value.

Figure 4A:
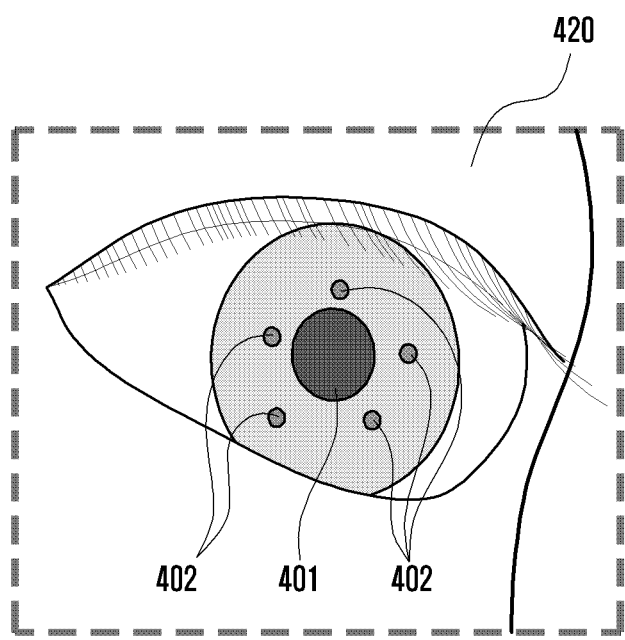
FIGS. 4A and 4B are diagrams illustrating front image information and user binocular image information according to various embodiments.
Figure 4B:
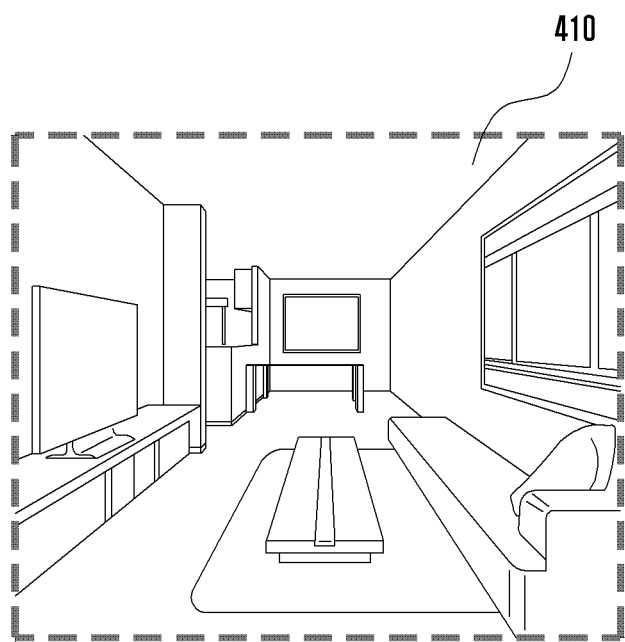

FIGS. 4A and 4B are diagrams illustrating front image information and user binocular image information according to various embodiments.

FIG. 4A is a diagram illustrating user binocular image information 420 according to various embodiments, and FIG. 4B is a diagram illustrating front image information 410 according to various embodiments.

Referring to FIG. 4B, the front image information 410 may include image information obtained by photographing an object in front of a frame (e.g., the frame 223 of FIG. 2A). The front image information 410 may be used for recognizing an object existing in front of the frame, and be used for tracking a motion of a user's hand or an object existing in front of the frame. For example, the front camera (e.g., the front camera 213 of FIG. 2A) may photograph the front object. According to various embodiments, the front camera 213 may photograph the front object and generate front image information.

With reference to FIG. 4A, the eye tracking camera 212 may photograph a rear object, for example, both eyes of a user, and generate binocular image information 420. Referring to FIGS. 4A and 4B, the binocular image information 420 is described based on one of both eyes (e.g., the user's left eye or the user's right eye) for convenience, but it is not limited thereto and may be image information obtained by photographing both eyes. The binocular image information 420 may include left eye image information corresponding to the left eye and right eye image information corresponding to the right eye of a user wearing the electronic device (e.g., the electronic device 101 of FIGS. 1, 2A, and/or 2B). According to various embodiments, the binocular image information 420 may be used for tracking a movement of the user's pupil 401. The movement of the user's pupil 401 may be tracked through a relative distance between the pupil 401 and a light emitting point 402 of the light emitting unit (e.g., the light emitting device 242 of FIG. 2) projected on the user's eye. The light emitting point 402 may refer, for example, to a point having the strongest light intensity projected onto the user's eyes in the light emitting unit. The movement of the pupil 401 may be tracked using a change in a relative distance between the plurality of light emitting points 402 and the pupil 401.

According to various embodiments, the processor (e.g., the processor 120 of FIG. 1) may obtain the user's gaze direction by tracking a movement of the user's pupil 401 through the binocular image information 420. The processor may control the display module (e.g., the display module 160 of FIG. 1) using the gaze direction.

For example, the processor may control the display module so that the center of the image projected on the glass member (e.g., the first glass 220 and/or the second glass 230 of FIG. 2A) coincides with the user's gaze direction. In an embodiment, the processor may control the display module so that a resolution of the AR image corresponding to a certain region is adjusted to be higher than that of the remaining regions based on the user's gaze direction. In an embodiment, the processor may generate an AR image such that a certain region is configured as a target region based on the user's gaze direction and the AR object is positioned in the region. According to various embodiments, the processor may control the display module in various ways or generate an AR image using the gaze direction obtained through the binocular image information 420.

According to various embodiments, the display module (e.g., the display module 160 of FIG. 1) may output the AR image generated by the processor 120. When an AR image is generated by the display module and projected on the glass module, an object included in the AR image may be combined with visible light of the front applied through the glass module to implement AR. The display module may be a projector (e.g., micro projector, pico projector) with a very small size. For example, the display module may be a laser scanning display (LSD), a raster/retinal scanning display (RSD), a digital micro-mirror display (DMD), and a liquid crystal on silicon (LCoS). Further, the display module may be a transparent display. In this case, a light emitting element included in the display module may be directly disposed in the glass module. Further, the display module may be various display devices for implementing AR.

Figure 5:
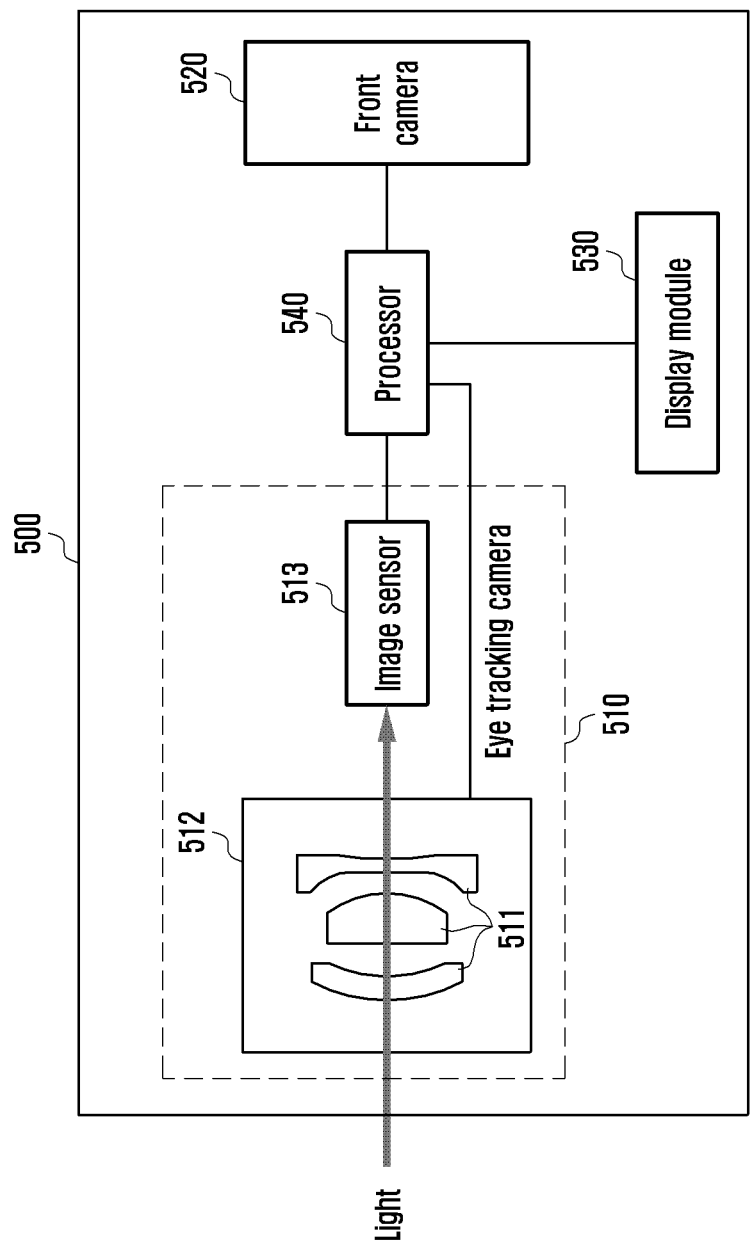
FIG. 5 is a block diagram illustrating an example configuration of an electronic device for tracking gaze and providing an AR environment according to various embodiments.

FIG. 5 is a block diagram illustrating an example configuration of an electronic device for tracking gaze and providing an AR environment according to various embodiments.

With reference to FIG. 5, an electronic device 500 may include an eye tracking camera 510, a front camera 520, a display module (e.g., including display circuitry) 530, and a processor (e.g., including processing circuitry) 540. The electronic device 500 may include at least a portion of the configuration and/or functions of the electronic device 101 of FIG. 1.

According to various embodiments, the eye tracking camera 510 (e.g., the eye tracking camera 212 of FIG. 2A) may photograph the rear of the frame (e.g., the frame 223 of FIG. 2B). For example, the eye tracking camera 510 may photograph both eyes of a user wearing the electronic device 500 and generate binocular image information (e.g., the binocular image information 420 of FIG. 4A). According to various embodiments, the eye tracking camera 510 may detect the user's gaze direction (e.g., pupil movement). For example, the eye tracking camera 510 may photograph both the user's left eye and the user's right eye to track gaze directions of each of both eyes.

According to various embodiments, the eye tracking camera 510 may include a lens assembly 511, a lens holder 512, and an image sensor 513.

According to various embodiments, the lens assembly 511 may refract and transmit incident light. The light incident on the lens assembly 511 may be, for example, light reflected from a region including both eyes of a user wearing the electronic device 500 and/or a peripheral portion thereof. According to various embodiments, light reflected from a region including the user' both eyes and/or a periphery thereof may be natural light including visible light and/or infra-red (IR) light of an infrared wavelength emitted from the light emitting module (e.g., the light emitting device 242 of FIG. 2). According to various embodiments, the lens assembly 511 may include a plurality of lenses. The plurality of lenses included in the lens assembly 511 may have physical quantities (e.g., refractive index, focal length, curvature, magnification, or distortion value) according to different optical properties. According to various embodiments, the plurality of lenses included in the lens assembly 511 may be sequentially stacked and disposed in a direction in which light is incident on the lens assembly 511. A FoV of the lens assembly 511 may be formed over a wide angle compared to a distance (e.g., object distance) between the lens assembly 511 and both eyes of the user, and may have to have optical properties for having sufficient resolution despite the wide FoV. According to various embodiments, the lens assembly 511 may have a physical quantity enabling to have the above-described optical properties, and the above-described physical quantity may be implemented into a combination of physical quantities of each of a plurality of lenses included in the lens assembly 511. According to various embodiments, the plurality of lenses may be disposed to satisfy optical properties that enable the lens assembly 511 to have a wide FOV compared to the object distance. According to various embodiments, the plurality of lenses of the lens assembly may be made of various materials. For example, the plurality of lenses may be made of a material of glass, plastic, quartz, or polycarbonate. According to various embodiments, a first lens disposed at the outermost side may be made of a glass material. For example, the first lens may be made of a crown glass, flint glass, or titanium glass material, but the disclosure is not limited thereto. The electronic device (e.g., the electronic device 101 of FIG. 1) may be a wearable device, and damage due to wearing and contamination of foreign substances may occur more easily. Because the first lens is present at the outermost side of the lens assembly, the first lens may be made of a material that is easy to prevent and/or reduce damage and/or contamination. According to various embodiments, the remaining lenses other than the first lens of the plurality of lenses may be plastic lenses.

According to various embodiments, the lens holder 512 may support a plurality of lenses included in the lens assembly 511. The lens holder 512 may support a plurality of lenses so that each of the plurality of lenses may be disposed with a certain distance and/or position. According to various embodiments, the lens holder 512 may include a driving unit (not illustrated), and the driving unit may adjust distances and positions between the plurality of lenses to change optical properties (e.g., magnification) of the lens assembly 511.

According to various embodiments, the image sensor 513 may convert light incident through the lens assembly 511 into an electrical signal. The image sensor 513 may include a plurality of pixels, and each pixel may include a light receiving element that converts incident light into an electrical signal. The image sensor may be formed with, for example, a semiconductor element such as a charged coupled device (CCD), a complementary metal-oxide semiconductor (CMOS), or the like. According to various embodiments, according to various embodiments, the image sensor 513 may convert incident light into an electrical signal to generate image information. According to various embodiments, the binocular image information may be image information generated by receiving visible light or infrared light reflected from a region including both eyes of the user and/or a peripheral portion thereof.

According to various embodiments, the front camera 520 may photograph an object in front of the electronic device 500. The front may refer, for example, to the front of the frame (e.g., the frame 223 of FIG. 2A). The front camera 520 may include at least some of the functions and/or configurations of the front camera 213 of FIG. 2A. According to various embodiments, the front camera 520 may photograph a front object and generate front image information.

According to various embodiments, the display module 530 may include various display circuitry and provide visual information to the user. The display module 530 may include at least a portion of functions and/or configurations of the display module 160 of FIG. 1. According to an embodiment, the display module 530 may include a display panel and/or a lens (e.g., glass). For example, the display panel may include a transparent material such as glass or plastic. According to an embodiment, the display module 530 (e.g., the display module 214 of FIG. 2A) may be disposed in a frame (e.g., the frame 223 of FIG. 2B) of the electronic device and include a condensing lens (not illustrated) and/or a transparent waveguide (not illustrated) in glass (e.g., the first glass 220 and the second glass 230 of FIG. 2A). For example, the transparent waveguide may be positioned at least partially in a portion of the glass. According to an embodiment, the waveguide may induce display light emitted from a light source to the user's eyes using at least one diffractive element or a reflective element. According to various embodiments, the display module 530 may output an AR image generated by the processor 540. According to various embodiments, the display module 530 may be a projector (e.g., micro projector or pico projector) having a very small size. For example, the display module 530 may be a laser scanning display (LSD), a raster/retinal scanning display (RSD), a digital micro-minor display (DMD), and a liquid crystal on silicon (LCoS). Further, the display module 530 may include a transparent display. In this case, a light emitting element included in the display module 530 may be directly disposed in a glass module (e.g., the first glass 220 and/or the second glass 230 of FIG. 2A). Further, the display module 530 may be various display devices for implementing AR.

According to various embodiments, the processor 540 may include various processing circuitry and process data in the electronic device 500, control at least one other component related to a function of a terminal device, and perform data processing and/or operation necessary for performing a function. The processor 540 may include at least a portion of the functions and/or configuration of the processor 120 of FIG. 1. The processor 540 may be electrically and/or functionally connected to components of the electronic device 500 such as the eye tracking camera 510, the front camera 520, and the display module 530. According to various embodiments, it is not limited to operation and data processing functions that may be implemented by the processor 540 in the electronic device, but in this disclosure, a function of tracking the user's gaze and outputting an AR image to provide an AR service will be mainly described.

According to various embodiments, the processor 540 may receive front image information from the front camera 520. The front camera 520 may photograph an object existing in front of the electronic device 500, for example, in front of the frame (e.g., the frame 223 of FIG. 2A), and generate front image information on the photographed image. The processor 540 may recognize an object existing in front of the frame using the front image information, and track the user's hand or an object existing in front of the frame.

According to various embodiments, the processor 540 may generate an AR image based on front image information. The processor 540 may analyze the front image information to recognize an object existing in front, and generate a virtual object corresponding to the object existing in the front. The processor 540 may generate an AR image including a virtual object.

According to various embodiments, the processor 540 may receive binocular image information from the eye tracking camera 510. The eye tracking camera 510 may photograph the rear of the electronic device 500, for example, a rear direction of the frame (e.g., the frame 223 of FIG. 2A), and photograph both eyes of a user wearing the electronic device. The processor 540 may receive binocular image information generated by at least partially photographing both eyes of the user including the left and right eyes of the user wearing the electronic device 500 from the eye tracking camera 510.

According to various embodiments, the processor 540 may detect a gaze direction based on binocular image information. According to various embodiments, the processor 540 may track a pupil movement of the user using the binocular image information. According to various embodiments, the processor 540 may track the user's pupil movement through the binocular image information to obtain the user's gaze direction.

According to various embodiments, the processor 540 may determine a position of the AR image based on the gaze direction and output the AR image. According to various embodiments, the processor 540 may control the display module 530 to project light onto the glass module (e.g., the first glass 220 and/or the second glass 230 of FIG. 2A), thereby enabling to output an AR image.

According to various embodiments, the processor 540 may control the display module 530 to output a generated AR image. When an AR image is output from the display module 530 to be projected on the glass module, a virtual object included in the AR image may be combined with visible light of the front applied through the glass module to implement AR.

According to various embodiments, the processor 540 may determine a position of the AR image based on the gaze direction. For example, the processor 540 may control the display module 530 so that the user's gaze direction and the center of the image projected on the glass module (e.g., the first glass 220 and/or the second glass 230 of FIG. 2A) coincide with each other. In an embodiment, the processor 540 may control the display module 530 to adjust a resolution of the AR image corresponding to a certain region based on the user's gaze direction to be higher than that of the remaining regions. In an embodiment, the processor 540 may output an AR image such that the AR object is positioned in a certain region based on the user's gaze direction. In an embodiment, the processor 540 may change and output a position of the output AR image based on the gaze direction. Further, the processor may control the display module in various ways or generate an AR image using the gaze direction obtained through the binocular image information.

Figure 6:
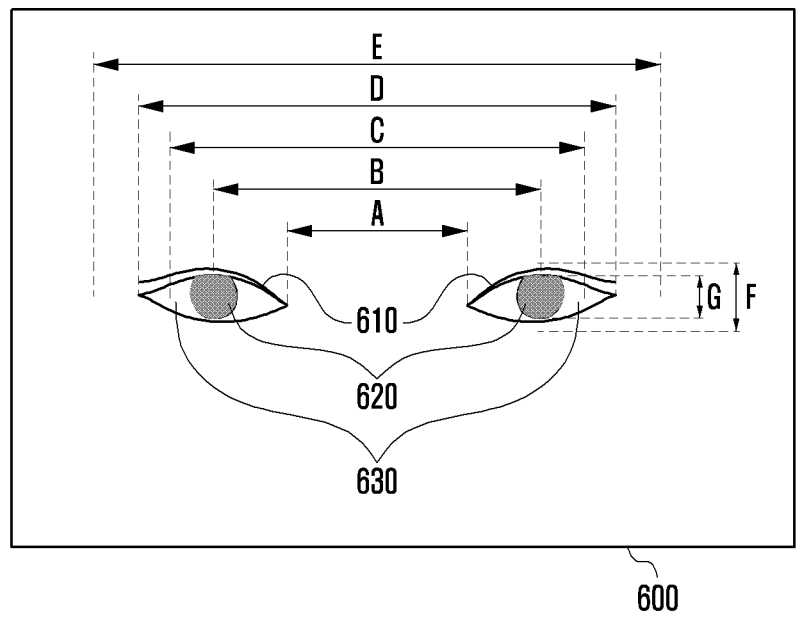
FIG. 6 is a diagram illustrating a region of interest of an eye tracking camera according to various embodiments.

FIG. 6 is a diagram illustrating a region of interest of an eye tracking camera according to various embodiments.

FIG. 6 illustrates an example of a photographing range (FOV) 600 of an eye tracking camera (e.g., the eye tracking camera 510 of FIG. 5). For example, the photographing range 600 may be referred to as a field of view (FOV). The FOV may refer, for example, to an angle at which the eye tracking camera 510 may photograph or may convert a distance to an object to be photographed into a length unit using a specific angle. When converted to a length unit, the FOV may refer, for example, to a horizontal and/or vertical length (distance) of the photographing range 600. The FOV may refer, for example, to an angle and/or length, and there is no limitation in a direction of the angle and/or length, but in this disclosure, for convenience, the FOV will be described based on the angle and/or length in the horizontal direction.

Referring to FIG. 6, both eyes 610 including a left eye (reference numeral is not illustrated) and a right eye (reference numeral is not illustrated) may each include a pupil 620 and a white 630, respectively. A line A may be a shortest distance between both eyes. A line B may be a distance between centers of the pupil 620 (inter-pupillary distance (IPD)). A line C may be a distance having a certain value between a longest distance between both eyes 610 and a distance between pupils 620, a line D may be a longest distance between both eyes 610, and a line E may be a distance exceeding a longest distance between both eyes 610 by a certain length. According to an embodiment, in lines F and G formed in a vertical direction, the line F may be a distance exceeding a vertical length of both eyes 610 by a certain length, and the line E may be a distance exceeding a diameter of the pupil 620 or a vertical length of the pupil 620 by a certain length.

According to various embodiments, the FOV (or photographing range) 600 may be formed in a range including the user's both eyes 610 and/or a peripheral portion thereof. Gaze tracking may be performed by continuously identifying a movement of the pupil 620; therefore, a region that may determine a movement of the pupil may have to be included in the FOV 600. According to various embodiments, in order to photograph the movement of the pupil 620, the white 630 may be included in a certain portion. In order to recognize the pupil 620 on the binocular image, a certain portion of the white 630 region may have to be included in the FOV 600. According to various embodiments, a range of the FOV 600 may be formed in a region including the entire pupil 620. According to various embodiments, the FOV 600 may be formed in a region including the entire range of both eyes 610. According to various embodiments, because binocular sizes of various users, a distance (e.g., object distance) between the electronic device (e.g., the electronic device 500 of FIG. 5) and the user's face, and/or a distance between both eyes of the user may be different, the FOV 600 may be formed in a range exceeding a range including both eyes 610 in consideration of this. According to various embodiments, the FOV 600 may have to be formed in a distance including at least the pupils 620 of both eyes, and be a distance satisfying at least one length of the line B, the line C, the line D, and the line E, and/or a length and/or distance including an angular range in which the corresponding length is converted using the object distance. According to an embodiment, the FOV 600 of the eye tracking camera 510 may be considered in a range extending vertically, and a FOV of a region extending vertically may be formed in a range that may include both eyes 610, for example, a range including at least the line F. According to an embodiment, the FOV of the region extending vertically may be formed in a range including at least the pupil 620, for example, a range including at least the line G.

According to various embodiments, the FOV 600 of the eye tracking camera (e.g., the eye tracking camera 510 of FIG. 5) may include a region of interest (ROI). The ROI may be, for example, a region necessary for binocular image analysis among the entire region of the binocular image obtained from the eye tracking camera 510. The ROI of the eye tracking camera 510 may be formed in a certain region enclosing both eyes 610 of the user, including both eyes 610 of the user. According to an embodiment, the ROI of the eye tracking camera 510 may include only a region of both eyes 610 of the user. According to an embodiment, the ROI of the eye tracking camera 510 may be formed in a certain region enclosing the pupils 620 of both eyes. According to an embodiment, the ROI may include only the pupil 620 region of both eyes. According to various embodiments, the ROI may be formed in at least a partial region of a region outside the FOV 600 including at least the user's pupil 620 among regions within the FOV 600.

According to various embodiments, when the FOV is formed in a range including the line D, the maximum range of the FOV may be about 85-95 mm in consideration of an average distance and/or size of an eyeball. Further, when a distance between the face and the eye tracking camera is configured to a range of about 26-50 mm, the range of the FOV may be formed in the maximum angle range of about 85°-120°. According to various embodiments disclosed in this disclosure, it is not limited to the above distance and angle range, but for convenience, it will be described based on a FOV of a range of 120° within an object distance of 26 mm and a distance range of 90 mm converted to a distance. According to an embodiment, when the FOV is formed in a range including the line F based on the vertical direction, the maximum range of the FOV in the vertical direction may be formed in about 20 mm, which is an average size and/or height of the eyeball. According to an embodiment, when the FOV is formed in the range including the line G based on the vertical direction, the maximum range of the FOV in the vertical direction may be formed in about 10-13 mm, which is an average size of the pupil.

Figure 7A:
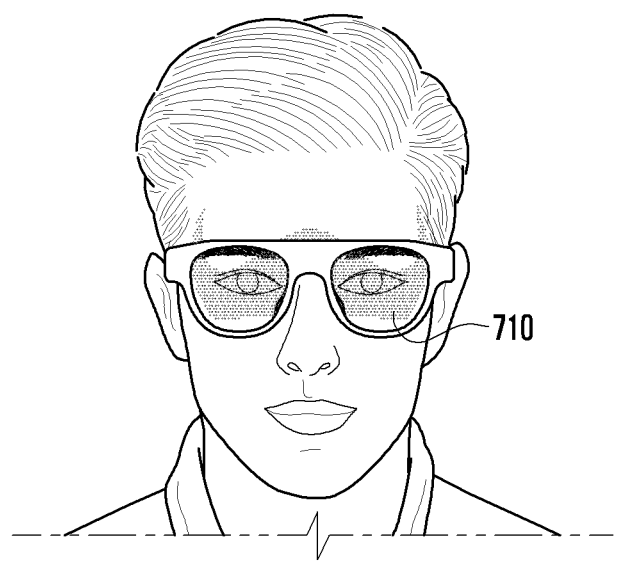
FIGS. 7A and 7B are diagrams illustrating a field of view (FOV) and a region of interest of an eye tracking camera according to various embodiments.
Figure 7B:
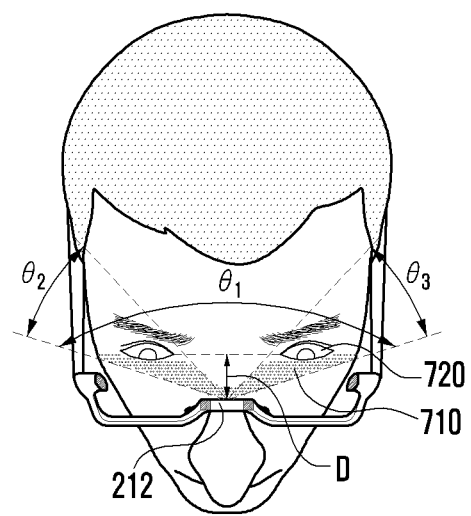

FIGS. 7A and 7B are diagrams illustrating a field of view (FOV) and a ROI of an eye tracking camera according to various embodiments. FIG. 7A is a diagram illustrating a user wearing the electronic device 101 on a face as viewed from the front, and FIG. 7B is a diagram illustrating a user wearing the electronic device 101 on a face as viewed from the upper side according to various embodiments.

Referring to FIG. 7A, the user may wear the electronic device 101 on the face. When considering a contour and unevenness of the user's face, a FoV 710 of the eye tracking camera 212 included in the electronic device 101, as illustrated in the shaded portions of FIGS. 7A and 7B may be formed in a range including the user's both eyes 720. In FIG. 6, as described above, a range of the FOV 710 is not limited thereto, and may be formed in various ranges such as a range including only pupils of both eyes and/or a range including at least a partial region between a range including only pupils and a range including both eyes of the user, but in this disclosure, for convenience, it is described that the FOV is formed in a certain range including both eyes. According to various embodiments, a certain range within the FOV 710 may be an ROI. The ROI may be understood as a specific angle, such as the FOV 710. For example, the ROI may refer to an angular range corresponding to the region including both eyes 720 of the user. Referring to FIG. 7B, the FOV 710 of the eye tracking camera 212 may be a region corresponding to an angle θ1. Referring to FIGS. 7A and 7B, the ROI of the eye tracking camera 212 may be a region corresponding to at least a portion of angles θ2 and θ3. According to various embodiments, the FOV 710 may be a certain distance derived from the relationship between the angle θ1 and the object distance (line D) between the face and the eye tracking camera. According to various embodiments, the FOV may be represented as a distance using a product of an angle and an object distance, and be represented as a length range including both eyes.

Figure 8:
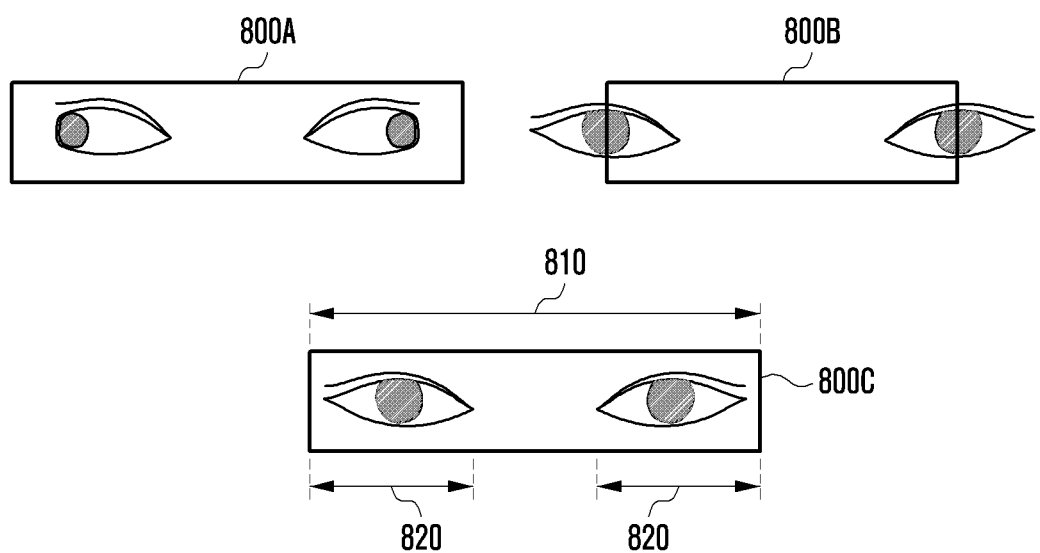
FIG. 8 is a diagram illustrating a viewing angle according to optical properties of a lens assembly according to various embodiments.

FIG. 8 is a diagram illustrating an FOV according to optical properties of a lens assembly according to various embodiments.

Referring to FIG. 8, FOVs may be formed, as in regions illustrated in reference numerals 800A, 800B, and 800C, respectively of FIG. 8, and be a photographed image of the same binocular eye using eye tracking cameras (e.g., the eye tracking camera 212 of FIG. 2A and/or the eye tracking camera 510 of FIG. 5) having different optical properties. FIG. 8 is a diagram illustrating a first example 800A of abnormal photographing, a second example 800B of abnormal photographing, and an example 800C of normal photographing. In the case of the first example 800A, it may be identified that distortion occurs in both eyes of the user and pupils included therein. The eye tracking camera disclosed herein may have a single camera configuration. Therefore, both eyes may be photographed with a single camera, and a relatively wide FOV may be required compared to an object distance (e.g., a distance between the eye tracking camera and the face or a distance between the electronic device 101 and the face). Optical properties of wide angle cameras for photographing wide angles may include barrel distortion. Referring to reference numeral 800A, barrel distortion may have an effect of reducing a distance between points of an image in an outer range of the FOV compared to an actual distance, and because a photographed image in an outer region of the FOV is obtained in a reduced form, an image in which an outer edge of both eyes and the pupil are distorted may be obtained. When such a distorted image is obtained, it may be difficult to identify a relative position of the pupil, and accurate gaze tracking may not be easy. Referring to reference numeral 800B, barrel distortion does not exist, but a FOV may be formed in a small range. In order to remove barrel distortion, the effect of slightly reducing the FOV may occur. In this case, only a portion of both eyes may be photographed, and accurate gaze tracking may be difficult. According to various embodiments of the disclosure, in order to form a FOV of a relatively large value compared to the object distance, and to prevent and/or reduce distortion of an image taken in a region outside the FOV due to barrel distortion, a lens assembly (e.g., the lens assembly 511 of FIG. 5) included in the eye tracking camera may have certain optical properties. For example, the lens assembly may form a wide FoV 810 compared to the object distance, and have a distortion value of a certain level or less in a range of the ROI 820 including both eyes.

Figure 9A:
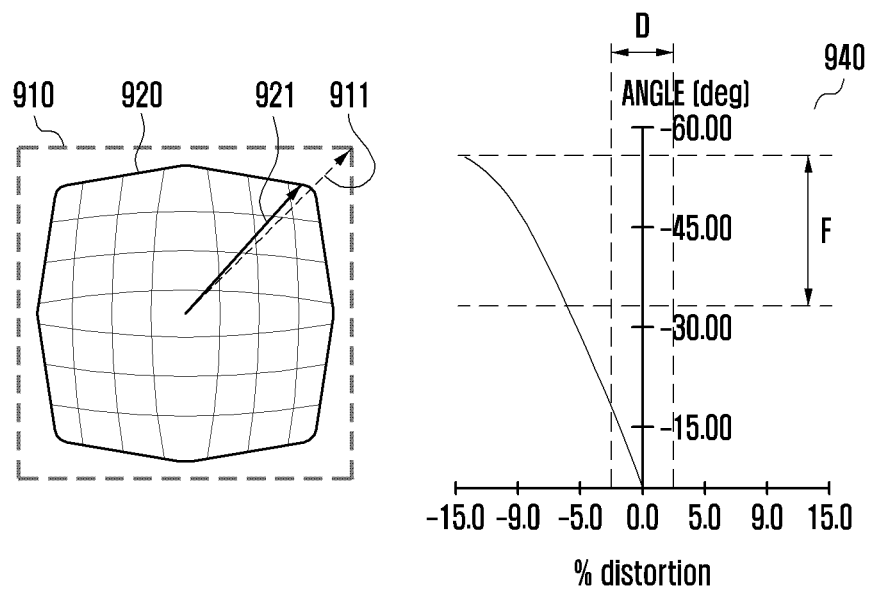
FIGS. 9A, 9B and 9C are diagrams illustrating optical properties of a lens assembly according to various embodiments.
Figure 9B:
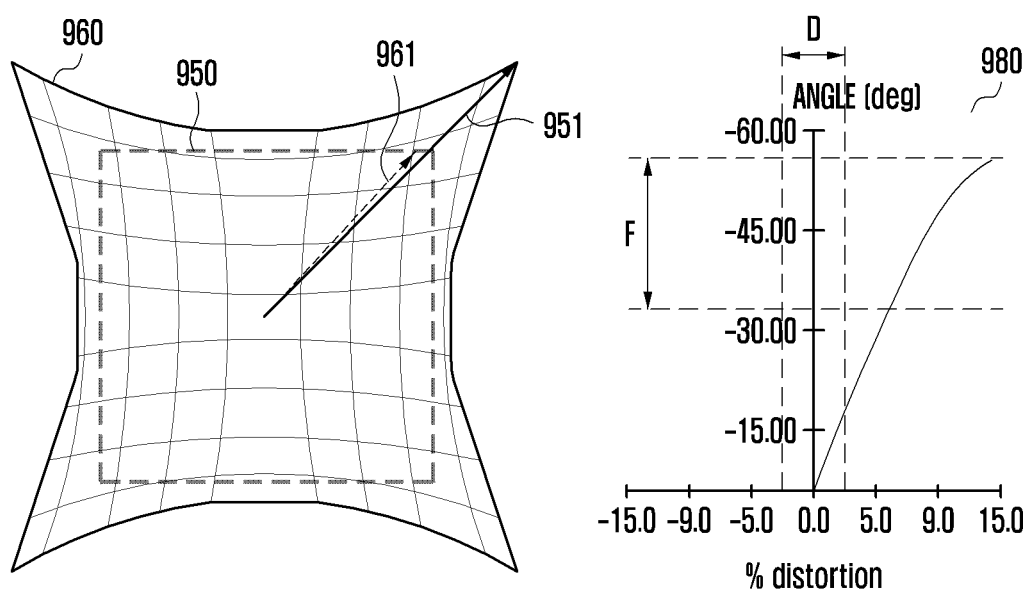
Figure 9C:
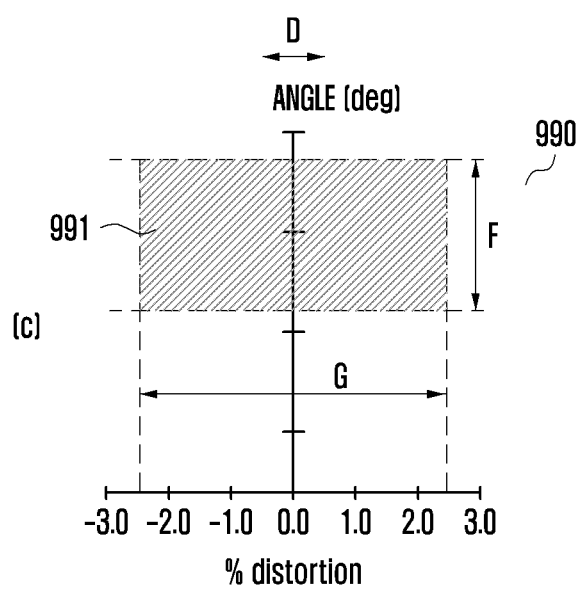

FIGS. 9A, 9B and 9C are diagrams illustrating optical properties of a lens assembly according to various embodiments.

FIGS. 9A, 9B and 9C are diagrams illustrating a general distortion property of a lens and a range of a distortion value of a lens for reflecting optical properties of a lens assembly according to various embodiments.

Referring to FIGS. 9A, 9B and 9C, distortion characteristics of the lens may include barrel distortion, pincushion distortion, or a mixture thereof.

Referring to FIGS. 9A, 9B and 9C, a difference between an actual image and an image formed on the lens may occur due to distortion according to distortion characteristics among optical properties of the lens. Distortion may vary according to a wavelength range of light passing through the lens, a distance between the lens and an object, and a magnification of the lens.

With reference to FIG. 9A, in the case of barrel distortion, a measured image 920 may have a reduced form compared to an undistorted real image 910. When describing based on the outermost side from the center of the lens, a barrel distortion lens may have an actual distance (AD) 921 shorter than a predicted distance (PD) 911. A distortion value representing the degree of distortion may be represented as percent (%) information, as illustrated in Equation 1. When barrel distortion occurs, a distortion value may be negative.

$$\text{distortion } (\%) = \left(\frac{AD - PD}{PD}\right) * 90\% \qquad \text{[Equation 1]}$$

When barrel distortion occurs, a distortion curve may appear, as in a graph illustrated at reference numeral 940. When barrel distortion occurs, a distortion curve may be formed such that a distortion value increases in absolute value in a negative direction as a FOV (degree) increases.

Referring to FIG. 9B, when pincushion distortion occurs, a measured image 960 may be enlarged compared to an undistorted real image 950. When describing based on a point far from the center, the lens of pincushion distortion may have an actual distance (AD) 961 longer than a measured distance 951 (predicted distance (PD)) thereof. According to [Equation 1], when pincushion distortion occurs, a distortion value may be positive. When pincushion distortion occurs, a distortion curve may appear, as in a graph illustrated at reference numeral 980. When pincushion distortion occurs, a distortion curve may be formed such that a distortion value increases in absolute value in a positive direction as a FOV (degree) increases.

The lens assembly (e.g., the lens assembly 511 of FIG. 5) according to various embodiments disclosed herein may have to form a wide field of view (FOV) at a relatively short object distance. According to various embodiments, the ROI of the lens assembly may be formed outside the FOV. In the case of barrel distortion, an actual distance AD of a formed image may be shorter than a measured distance PD based on an outer range, and accordingly, a relatively wide region may be included in the FOV and photographed. However, while advancing to the outer region of the lens, pixels per degree (PPD) may decrease due to the difference between the measured distance and the actual distance. Due to the decrease in PPD, the resolution of the binocular image taken in the outer range of the FOV may be lowered, which may not be appropriate for performing gaze tracking. Pincushion distortion may have a narrower FOV compared to barrel distortion. However, although the PPD may increase, when an absolute value of the distortion value increases by a certain level or more, it may be difficult to obtain an appropriate binocular image due to an excessive image error. According to various embodiments, distortion characteristics appropriate for performing gaze tracking may be obtained when a distortion value has a value close to 0% at an angle on the ROI.

Referring to FIG. 9C, distortion characteristics according to various embodiments disclosed in herein may have to be formed in a hatched region 991 of an appropriate distortion value graph region 990. A vertical axis range F of the hatched region of the graph 990 representing the appropriate distortion value may be an angular range within the FOV formed by the ROI. A horizontal axis range D of the hatched region of the graph 990 representing the appropriate distortion value according to various embodiments may be a distortion value range. For example, when an angle of the ROI in which both eyes may be positioned inside the FOV is expected to be within the F range, a range of distortion for obtaining sufficient resolution of the binocular image in the F range may be defined as D. The lens assembly (e.g., the lens assembly 511 of FIG. 5) according to various embodiments may form a distortion characteristic such that a distortion curve passes through the hatched region 991. Each of the plurality of lenses included in the lens assembly according to various embodiments may be disposed with respective optical properties (e.g., magnification) and/or distances that may form a distortion curve that passes through the hatched region 991. According to various embodiments, the range of the ROI of the FOV may be represented as a ratio to the FOV. For example, assuming that the maximum FOV angle is 1.0 F (FOV) and that a region within the FOV is included in a range of −1.0 F to 1.0 F using 0.0 F as the center value, a range of both eyes, that is, a range of the ROI may be a range from 0.5 F to 0.9 F and from −0.5 F to −0.9 F. Referring to FIG. 9C, the vertical length F of the hatched region 991 may be formed in a range of 0.5 F to 0.9 F. According to various embodiments, the lens assembly may be characterized in that a distortion value in the ROI is formed within a specific range.

Figure 10:
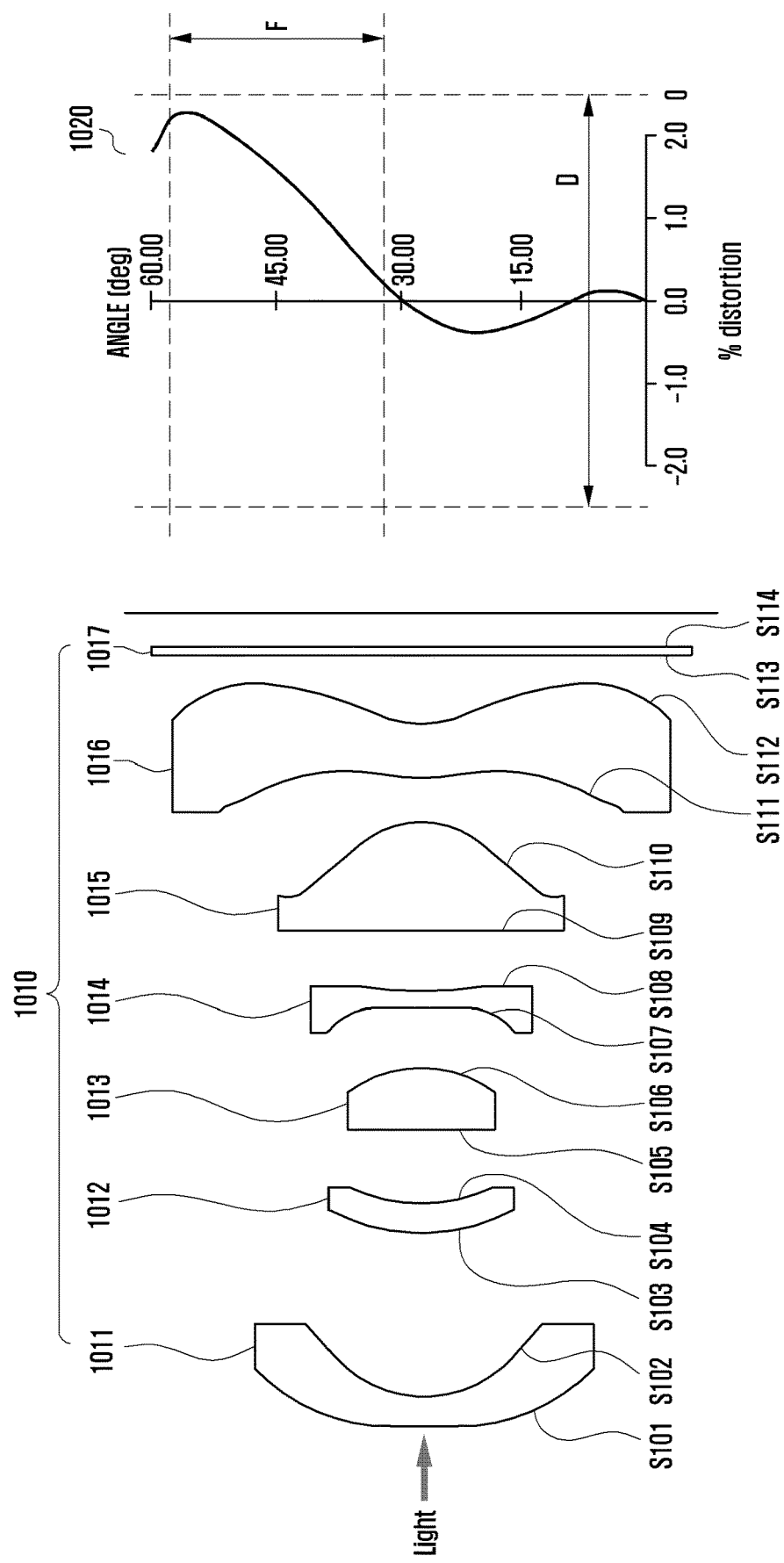
FIG. 10 is a diagram illustrating optical properties of a lens assembly according to various embodiments.

FIG. 10 is a diagram illustrating optical properties of a lens assembly according to various embodiments.

Referring to FIG. 10, a lens assembly 1010 may include a plurality of lenses. The lens assembly 1010 of FIG. 10 may include at least a portion of the configuration and/or the function of the lens assembly 511 of FIG. 5. A plurality of lenses of the lens assembly 1010 may be sequentially stacked while forming a certain distance from an incident direction of light. For example, a first lens 1011 may be an outermost lens among lenses of the lens assembly 1010. According to various embodiments, the lens assembly 1010 may include a first lens 1011, a second lens 1012, a third lens 1013, a fourth lens 1014, a fifth lens 1015, and a sixth lens 1016. According to various embodiments, the image sensor (e.g., the image sensor 513 of FIG. 5) may receive visible light and/or infrared light, and the lens assembly 1010 may further include a filter 1017 that transmits only visible light or infrared light. According to various embodiments, the electronic device (e.g., the electronic device 500 of FIG. 5) may be a wearable device, and due to the characteristics of the wearable device, the outermost first lens 1011 may be in frequent body contact. In the case of the first lens 1011 existing at an outermost portion, it is necessary to prevent and/or reduce damage to the lens such as foreign matter adhesion or scratching. According to various embodiments, the plurality of lenses of the lens assembly 1010 may be made of various materials. For example, the plurality of lenses may be made of a material of glass, plastic, quartz, or polycarbonate. According to various embodiments, the first lens disposed at the outermost side may be made of a glass material. For example, the first lens may be made of a crown glass, flint glass, or titanium glass material, but the disclosure is not limited thereto. According to various embodiments, the remaining lenses other than the first lens of the plurality of lenses may be plastic lenses. According to various embodiments, in the lens assembly 1010, a distance between the lens assembly and the object may be in a range of about 26-50 mm, and a FOV based on the distance may be formed to have a maximum distance of 85-95 mm and a FOV based on the angle may be formed to have a maximum distance of 85°-120°. According to various embodiments disclosed herein, the disclosure is not limited to the above distance and angle ranges, but for convenience, a description will be made based on a FOV of 120° within an object distance of 26 mm and a distance of 90 mm in which 120° is converted to a distance. According to various embodiments, in order to form a FOV of relatively large 120° (or 90 mm) compared to an object distance of 26 mm, the lens assembly 1010 may have optical properties satisfying the corresponding object distance and FOV. Further, the lens assembly may be formed such that a distortion value of light incident on the FOV region corresponding to an outer portion is close to 0 so as to have sufficient resolution in the ROI formed at an outer portion of the FOV. Referring to FIG. 10, an example of a distortion curve 1020 with respect to distortion characteristics of the lens assembly 1010 may be identified. According to various embodiments, the distortion curve 1020 of FIG. 10 may be a graph of a half FOV region based on the FOV center. For example, the same graph may be formed in a line symmetrical form based on the horizontal axis, and the vertical axis may represent an omitted graph of a graph formed in a range of −60° to 0°. Referring to FIG. 10, a vertical axis of the distortion curve 1020 may refer to an angle (degree) within the FOV region, and a horizontal axis thereof may refer, for example, to a distortion value (%). A line F may be an angular range formed by the ROI within the FOV, and a line D may be a range of distortion values satisfying optical properties of the lens assembly. According to various embodiments, the ROI within the FOV may be formed in a portion where the user's both eyes are to be positioned inside the binocular image information, that is, outside the FOV, which may be formed within a range of a ratio of 0.5 to 0.9 of the entire FOV region. A distortion value of the lens assembly 1010 according to various embodiments may be formed in an absolute value close to 0, for example, within a range of 0-2.5% in the ROI. According to various embodiments, a plurality of lenses included in the lens assembly may be designed and disposed to have optical properties satisfying the distortion curve 1020. A plurality of lenses included in the lens assembly may be formed to have respective optical properties (e.g., magnification) to satisfy a distortion curve. The lens assembly for satisfying a FOV condition according to various embodiments of the disclosure may have characteristics of a wide angle lens, and have a tendency of a positive distortion value, unlike a general wide angle lens having a tendency of a negative distortion value. According to various embodiments, the lens assembly may be formed to have a positive value with respect to light incident in the ROI or to have an absolute value within a certain range (e.g., 0-2.5%) close to 0. Optical properties of the lens assembly according to various embodiments are not limited to the above numerical values, and may have various numerical values for satisfying an object distance and FOV conditions, ROI conditions, and/or distortion value conditions of the disclosure.

According to various embodiments, in order to satisfy optical characteristics of the lens assembly 1010, the plurality of lenses included in the lens assembly 1010 may have the following optical characteristic values. Each of the plurality of lenses and a filter may have two surfaces based on a direction from the first lens 1011 to the sixth lens 1016 (e.g., traveling direction of incident light). For example, the first lens 1011 may have a first surface S101 and a second surface S102, the second lens 1012 may have a third surface S103 and a fourth surface S104, the third lens 1013 may have a fifth surface S105 and a sixth surface S106, the fourth lens 1014 may have a seventh surface S107 and an eighth surface S108, the fifth lens 1015 may have a ninth surface S109 and a tenth surface S110, and the sixth lens 1016 may have an eleventh surface S111 and a twelfth surface S112. The filter 1017 may have a thirteenth surface S113 and a fourteenth surface S114. A surface of the lens included in the lens assembly 1010 may have a radius of curvature, a center thickness (or center distance) (thickness), a refractive index (nd), a dispersion index (Abbe's number, vd), and an aspheric modulus (e.g., K(conic), A, B, C, D, E, F, G, H, J, K(22th), L, M, N, O) of each surface based on a traveling direction of the incident light. According to various embodiments, each of the plurality of lenses may include an aspherical lens, and a shape of the aspherical lens may be defined as in Equation 1. A shape of an aspherical surface may take a Z axis in an optical axis direction and an X axis in a direction substantially perpendicular to the optical axis, and when Z is a distance from an apex of the lens in an optical axis direction, h is a distance in a direction perpendicular to the optical axis, r is a radius of curvature in the lens apex, K is a conic constant, and A, B, C, D, E, F, G, H, J, K(22th), L, M, N, and O are aspherical coefficients, it may be represented as Equation 2.

$$Z = (h^2/r) \Big/ \left(1 + \sqrt{1 - (1+K_{conic}) * \left(\frac{h^2}{r^2}\right)}\right) +$$
$$A*h^4 + B*h^6 + C*h^8 + D*h^{10} + E*h^{12} +$$
$$F*h^{14} + G*h^{16} + H*h^{18} + J*h^{20} +$$
$$K_{22th}*h^{22} + L*h^{24} + M*h^{26} + N*h^{28} + O*h^{30}$$

[Equation 2]

According to various embodiments, the optical characteristic values of each of the plurality of lenses and the filter may have a value within a range of about 5% from a desired value. Desirable optical characteristic values of the plurality of lenses and the filter of the lens assembly 1010 may have values illustrated in Table 1, Table 2, and Table 3. Table 1 may represent a radius of curvature, a thickness, a refractive index, and a dispersion index, and Tables 2a and 2b may represent an aspheric coefficient of each surface. Because the filter 1017 has a planar shape, an aspheric coefficient may not exist.

TABLE 1

| Lens | Surface | Radius of curvature (mm) | Thickness (mm) | Refractive index (nd) | Dispersion index (vd) |
|---|---|---|---|---|---|
| First lens 1011 | First surface S101 | 13.88013 | 0.30814 | 1.58375 | 59.1 |
| | Second surface S102 | 1.54494 | 0.77453 | | |
| Second lens 1012 | Third surface S103 | 1.71790 | 0.30000 | 1.61444 | 25.94 |
| | Fourth surface S104 | 2.18102 | 0.27511 | | |
| Third lens 1013 | Fifth surface S105 | 3.55564 | 0.60918 | 1.54410 | 56.09 |
| | Sixth surface S106 | −1.78678 | 0.26284 | | |
| Fourth lens 1014 | Seventh surface S107 | 7.52946 | 0.20703 | 1.67074 | 19.23 |
| | Eighth surface S108 | 2.87121 | 0.15030 | | |
| Fifth lens 1015 | Ninth surface S109 | −17.57924 | 1.07788 | 1.54410 | 56.09 |
| | Tenth surface S110 | −0.70913 | 0.10000 | | |
| Sixth lens 1016 | Eleventh surface S111 | 2.54671 | 0.52611 | 1.63915 | 23.51 |
| | Twelfth surface S112 | 0.67355 | 0.39500 | | |
| Filter 1017 | Thirteenth surface S113 | Infinity | 0.11000 | 1.51680 | 64.2 |
| | Fourteenth surface S114 | Infinity | 0.34540 | | |

TABLE 2

| Coefficient | First surface S101 | Second surface S102 | Third surface S103 | Fourth surface S104 | Fifth surface S105 | Sixth surface S106 |
|---|---|---|---|---|---|---|
| K | 0.00000E+00 | −3.92685E−01 | −2.08673E+00 | 7.84761E+00 | −6.87641E+00 | 3.38058E+00 |
| A | 2.14224E−01 | 3.07698E−01 | 8.30580E−03 | −3.04965E−02 | −4.38882E−02 | −1.34880E−01 |
| B | −1.99831E−01 | −1.89169E−01 | 1.85050E−01 | 1.42644E−01 | 1.55602E−02 | −5.74697E−01 |
| C | 1.52143E−01 | −1.81577E−01 | −9.22815E−01 | −1.36499E+00 | −8.89895E−02 | 4.06933E+00 |
| D | −8.37460E−02 | 1.11381E+00 | 2.04600E+00 | 4.91224E+00 | −2.18596E+00 | −1.47051E+01 |
| E | 3.01617E−02 | −2.14016E+00 | −2.16755E+00 | −7.74055E+00 | 5.29978E+00 | 3.16785E+01 |
| F | −6.32146E−03 | 2.11823E+00 | 9.09286E−01 | 4.64263E+00 | −9.11969E−01 | −4.27357E+01 |
| G | 6.13195E−04 | −1.08241E+00 | 0.00000E+00 | 0.00000E+00 | 0.00000E+00 | 3.31263E+01 |
| H | −1.15249E−05 | 2.23447E−01 | 0.00000E+00 | 0.00000E+00 | 0.00000E+00 | −9.79591E+00 |

TABLE 3

| Coefficient | Seventh surface S107 | Eighth surface S108 | Ninth surface S109 | Tenth surface S110 | Eleventh surface S111 | Twelfth surface S112 |
|---|---|---|---|---|---|---|
| K | −2.01235E+02 | 0.00000E+00 | −1.13375E+03 | −1.55768E+00 | −6.50603E+01 | −5.32687E+00 |
| A | −5.14634E−01 | −2.90038E−01 | 6.96639E−02 | 3.23323E−01 | 1.03288E−01 | −4.19826E−02 |
| B | 3.95291E−01 | 1.79308E−01 | −4.59013E−02 | −7.69646E−01 | −3.62182E−01 | −2.18221E−02 |
| C | −1.88846E+00 | −7.93029E−01 | −3.17996E−01 | 9.53164E−01 | 4.04940E−01 | 3.09398E−02 |
| D | 2.96566E+00 | 2.77031E+00 | 8.13243E−01 | −6.79278E−01 | −2.65026E−01 | −1.61203E−02 |

TABLE 3-continued

| Coefficient | Seventh surface S107 | Eighth surface S108 | Ninth surface S109 | Tenth surface S110 | Eleventh surface S111 | Twelfth surface S112 |
|---|---|---|---|---|---|---|
| E | 8.92296E+00 | −4.15049E+00 | −8.46696E−01 | 2.64849E−01 | 1.05547E−01 | 4.46648E−03 |
| F | −3.48203E+01 | 3.08768E+00 | 4.66729E−01 | −6.02462E−02 | −2.50420E−02 | −6.90068E−04 |
| G | 4.01612E+01 | −1.12636E+00 | −1.33836E−01 | 1.94672E−02 | 3.26626E−03 | 5.59642E−05 |
| H | −1.56188E+01 | 1.58763E−01 | 1.56656E−02 | −5.01745E−03 | −1.80682E−04 | −1.85295E−06 |

Figure 11:
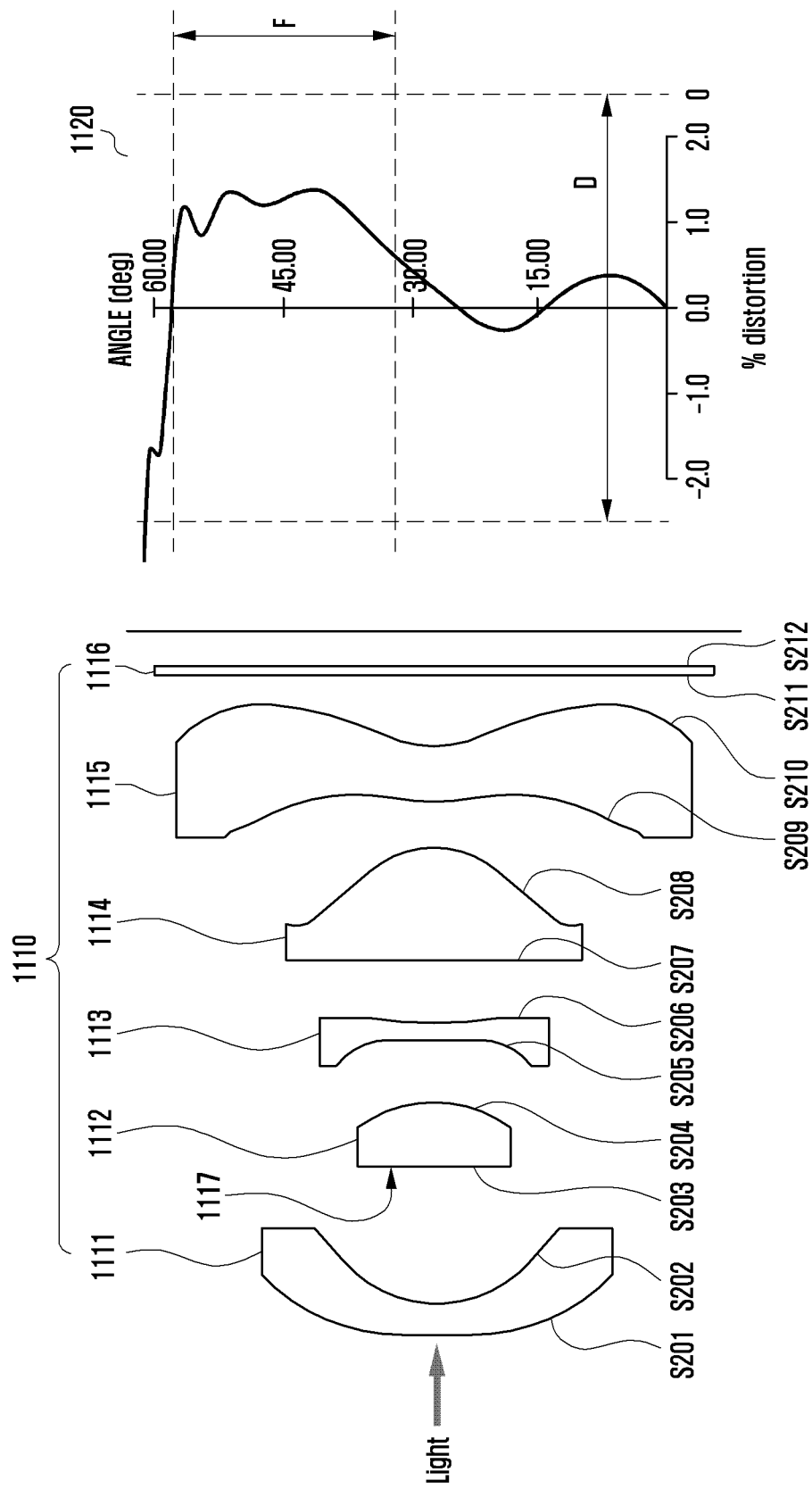
FIG. 11 is a diagram illustrating optical properties of a lens assembly according to various embodiments.

FIG. 11 is a diagram illustrating optical properties of a lens assembly according to various embodiments.

Referring to FIG. 11, a lens assembly 1110 may include a plurality of lenses. The lens assembly 1110 of FIG. 11 may include at least a portion of the configuration and/or the function of the lens assembly 511 of FIG. 5. A plurality of lenses of the lens assembly 1110 may be sequentially stacked while forming a certain distance from an incident direction of light. For example, a first lens 1111 may be an outermost lens among lenses of the lens assembly 1110. According to various embodiments, the lens assembly 1110 may include a first lens 1111, a second lens 1112, a third lens 1113, a fourth lens 1114, and a fifth lens 1115. According to various embodiments, the image sensor (e.g., the image sensor 513 of FIG. 5) may receive visible light and/or infrared light, and the lens assembly 1110 may further include a filter 1116 for transmitting only visible light or infrared light and an aperture 1117 for blocking light. According to various embodiments, the electronic device (e.g., the electronic device 500 of FIG. 5) may be a wearable device, and due to characteristics of the wearable device, the outermost first lens 1111 may be in frequent body contact. In the case of the first lens 1111 existing at the outermost side, it is necessary to prevent and/or reduce damage to the lens such as foreign matter adhesion or scratching. According to various embodiments, the plurality of lenses of the lens assembly 1110 may be made of various materials. For example, the plurality of lenses may be made of a material of glass, plastic, quartz, or polycarbonate. According to various embodiments, the first lens disposed at the outermost side may be made of a glass material. For example, the first lens may be made of a crown glass, flint glass, or titanium glass material, but it is not limited thereto. According to various embodiments, the remaining lenses other than the first lens of the plurality of lenses may be plastic lenses. According to various embodiments, in the lens assembly 1110, a distance between the lens assembly and the object may be in a range of 26-50 mm, and a FOV based on the distance may be formed to have a maximum distance of 85-95 mm, and a FOV based on the angle may be formed to have a maximum distance of 85°-120°. According to various embodiments disclosed herein, the disclosure is not limited to the above distance and angle ranges, but for convenience, a description will be made based on a FOV of 120° within an object distance of 26 mm and a distance of 90 mm in which 120° is converted to a distance. According to various embodiments, in order to form a FOV of relatively large 120° (or 90 mm) compared to an object distance of 26 mm, the lens assembly 1110 may have optical properties satisfying the corresponding object distance and FOV. Further, the lens assembly may be formed such that a distortion value of light incident on the FOV region corresponding to an outer portion is close to 0 so as to have sufficient resolution in the ROI formed at an outer portion of the FOV. Referring to FIG. 11, an example of a distortion curve 1120 with respect to the distortion characteristic of the lens assembly 1110 may be identified. According to various embodiments, the distortion curve 1120 of FIG. 11 may be a graph of a half FOV region based on the FOV center. For example, the same graph may be formed in a line symmetrical form based on a horizontal axis, and a vertical axis may represent an omitted graph of a graph formed in a range of −60° to 0°. Referring to FIG. 11, a vertical axis of the distortion curve 1120 may refer, for example, to an angle within the FOV region, and a horizontal axis thereof may refer, for example, to a distortion value (%). The line F may be an angular range formed by the ROI within the FOV, and the line D may be a range of distortion values satisfying optical properties of the lens assembly. According to various embodiments, the ROI within the FOV may be formed in a portion where the user's both eyes are to be positioned inside the binocular image information, that is, outside the FOV, which may be formed within a range of a ratio of 0.5 to 0.9 of the entire FOV region. A distortion value of the lens assembly 1110 according to various embodiments may have an absolute value close to 0 in the ROI, for example, within a range of 0-2.0%. According to various embodiments, the plurality of lenses included in the lens assembly may be designed and disposed to have optical properties satisfying the distortion curve 1120. The plurality of lenses included in the lens assembly may be formed to have respective optical properties (e.g., magnification) satisfying the distortion curve. The lens assembly for satisfying the FOV condition according to various embodiments of the disclosure may have a characteristic of a wide angle lens, and have a tendency of a positive distortion value, unlike a general wide angle lens having a tendency of a negative distortion value. According to an embodiment, the lens assembly may have a negative distortion value in a FoV region (e.g., about 57° to 60°) close to 60°, but a region having a negative distortion value is an outermost region of the FOV and may be a portion that does not belong to the ROI. According to an embodiment, in the FOV region in which the lens assembly has a negative distortion value, the distortion value may be lowered by up to about −3.0%, but such a value may be very small in an absolute value compared to the characteristic of a general wide angle lens having a negative distortion value. According to various embodiments, the lens assembly may be formed to have a positive value with respect to light incident in the ROI or to have an absolute value within a certain range (e.g., 0-2.0%) close to 0. The optical properties of the lens assembly according to various embodiments are not limited to the above numerical values, and may be formed to have various numerical values for satisfying the object distance and FOV conditions, ROI conditions, and distortion value conditions of the disclosure.

According to various embodiments, in order to satisfy an optical characteristic of the lens assembly 1110, the plurality of lenses included in the lens assembly 1110 may have the following optical characteristic values. Each of the plurality of lenses and the filter may have two surfaces based on a direction from the first lens 1111 to the fifth lens 1115 (e.g., a traveling direction of incident light). For example, the first lens 1111 may have a first surface S201 and a second surface S202, the second lens 1112 may have a third surface S203 and a fourth surface S204, the third lens 1113 may have a fifth surface S205 and a sixth surface S206, the fourth lens 1114 may have a seventh surface S207 and an eighth surface S208, and the fifth lens 1115 may have a ninth surface S209 and a tenth surface S210. The filter 1116 may have an eleventh surface S211 and a twelfth surface S212, and the aperture 1117 may be represented as a stop because it blocks light. According to an embodiment, a stop of the aperture 1117 may be formed on the third surface S203. A surface of the lens included in the lens assembly 1110 may have a radius of curvature, a center thickness (or center distance) (thickness), a refractive index (nd), a dispersion index (Abbe's number, vd) and an aspheric modulus (e.g., K(conic), A, B, C, D, E, F, G, H, J, K(22th), L, M, N, O) of each surface based on a traveling direction of the incident light. According to various embodiments, each of the plurality of lenses may include an aspherical lens, and a shape of the aspherical lens may be defined as in Equation 1. A shape of an aspherical surface may take a Z axis in an optical axis direction and an X axis in a direction perpendicular to the optical axis, and when Z is a distance from an apex of the lens in an optical axis direction, h is a distance in a direction perpendicular to the optical axis, r is a curvature radius at the lens apex, K is a conic constant, and A, B, C, D, E, F, G, H, J, K(22th), L, M, N, and O are aspheric coefficients, it may be represented as Equation 3.

$$Z = (h^2/r) \Big/ \left(1 + \sqrt{1 - (1 + K_{conic}) * \left(\frac{h^2}{r^2}\right)}\right) + \\ A*h^4 + B*h^6 + C*h^8 + D*h^{10} + E*h^{12} + \\ F*h^{14} + G*h^{16} + H*h^{18} + J*h^{20} + \\ K_{22th}*h^{22} + L*h^{24} + M*h^{26} + N*h^{28} + O*h^{30}$$

[Equation 3]

According to various embodiments, an optical characteristic value of each of the plurality of lenses and the filter may have a value within a range of 4% from a desired value. Desirable optical characteristic values of the plurality of lenses and the filter of the lens assembly 1110 may have values represented in Table 4, Table 5, and Table 6. Table 4 may represent a radius of curvature, a thickness, a refractive index, and a dispersion index, and Tables 5 and 6 may represent an aspheric coefficient of each surface. Because the aperture 1117 and the filter 1116 have a planar shape, an aspheric coefficient may not exist.

TABLE 4

| Lens | Surface | Radius of curvature (mm) | Thickness (mm) | Refractive index (nd) | Dispersion index (vd) |
|---|---|---|---|---|---|
| First lens 1111 | First surface S201 | −5.31864 | 0.45649 | 1.54410 | 56.09 |
| | Second surface S202 | 6.13031 | 0.67888 | | |
| Aperture 1117 | stop | Infinity | 0.02672 | | |
| Second lens 1112 | Third surface S203 | 7.39550 | 0.62855 | 1.54410 | 56.09 |
| | Fourth surface S204 | −0.85955 | 0.07844 | | |
| Third lens 1113 | Fifth surface S205 | 2.95914 | 0.23461 | 1.67975 | 18.41 |
| | Sixth surface S206 | 1.32967 | 0.46188 | | |
| Fourth lens 1114 | Seventh surface S207 | −14.43739 | 0.71099 | 1.54410 | 56.09 |
| | Eighth surface S208 | −0.96771 | 0.08246 | | |
| Fifth lens 1115 | Ninth surface S209 | 0.94805 | 0.34070 | 1.67074 | 19.23 |
| | Tenth surface S210 | 0.49440 | 0.39779 | | |
| Filter 1116 | Thirteenth surface S213 | Infinity | 0.11000 | 1.51680 | 64.2 |
| | Fourteenth surface S214 | Infinity | 0.08574 | | |

TABLE 5

| Coefficient | First surface S201 | Second surface S202 | Third surface S203 | Fourth surface S204 | Fifth surface S205 |
|---|---|---|---|---|---|
| K(conic) | −1.05783E+01 | −6.23660E+02 | 3.00497E+02 | −9.57384E−02 | −8.51429E+00 |
| A | 2.84407E−01 | 1.01024E+00 | 4.75341E−01 | 1.63428E−01 | −7.46526E−01 |
| B | 1.19324E−01 | −7.72763E+00 | −1.17059E+02 | −2.45438E+01 | 2.69100E+00 |
| C | −1.77894E+00 | 1.18650E+02 | 9.12693E+03 | 9.07801E+02 | 3.23787E+01 |
| D | 6.19498E+00 | −1.29140E+03 | −4.42219E+05 | −1.94106E+04 | −8.31660E+02 |
| E | −1.32398E+01 | 9.49057E+03 | 1.41758E+07 | 2.75198E+05 | 9.42509E+03 |
| F | 1.93167E+01 | −4.80050E+04 | −3.14830E+08 | −2.72826E+06 | −6.82067E+04 |
| G | −1.97326E+01 | 1.69892E+05 | 4.98384E+09 | 1.94002E+07 | 3.39795E+05 |
| H | 1.41029E+01 | −4.22007E+05 | −5.70904E+10 | −1.00125E+08 | −1.19770E+06 |
| J | −6.90635E+00 | 7.26049E+05 | 4.74775E+11 | 3.75389E+08 | 3.01116E+06 |
| K(22th) | 2.20770E+00 | −8.32301E+05 | −2.84005E+12 | −1.01140E+09 | −5.36400E+06 |

TABLE 5-continued

| Coefficient | First surface S201 | Second surface S202 | Third surface S203 | Fourth surface S204 | Fifth surface S205 |
|---|---|---|---|---|---|
| L | −4.15087E−01 | 5.78494E+05 | 1.19126E+13 | 1.90697E+09 | 6.61096E+06 |
| M | 3.48249E−02 | −1.79192E+05 | −3.32657E+13 | −2.38733E+09 | −5.35834E+06 |
| N | 0.00000E+00 | −2.66324E+04 | 5.55595E+13 | 1.78191E+09 | 2.56803E+06 |
| O | 0.00000E+00 | 2.55681E+04 | −4.20042E+13 | −5.99950E+08 | −5.51080E+05 |

TABLE 6

| Coefficient | Sixth surface S206 | Seventh surface S207 | Eighth surface S208 | Ninth surface S209 | Tenth surface S210 |
|---|---|---|---|---|---|
| K(conic) | −1.96043E+00 | 6.13703E+01 | −9.79079E−01 | −1.35524E+01 | −4.06735E+00 |
| A | −6.59358E−01 | 3.71421E−01 | 2.52810E−01 | 1.74198E−01 | −3.84432E−03 |
| B | 3.15446E+00 | −1.10964E+00 | 2.85681E+00 | −9.64086E−01 | −7.20700E−01 |
| C | −2.08182E+01 | −4.31522E+00 | −2.92746E+01 | −3.01986E+00 | 1.49118E+00 |
| D | 1.39272E+02 | 4.94495E+01 | 1.36549E+02 | 1.77616E+01 | −1.58377E+00 |
| E | −7.05690E+02 | −2.23801E+02 | −4.11867E+02 | −3.88101E+01 | 1.03812E+00 |
| F | 2.49687E+03 | 6.41458E+02 | 8.83192E+02 | 5.07170E+01 | −4.46246E−01 |
| G | −6.12028E+03 | −1.28750E+03 | −1.39355E+03 | −4.43475E+01 | 1.28237E−01 |
| H | 1.03553E+04 | 1.87636E+03 | 1.63282E+03 | 2.70931E+01 | −2.44221E−02 |
| J | −1.18732E+04 | −2.00446E+03 | −1.41333E+03 | −1.17425E+01 | 2.95913E−03 |
| K(22th) | 8.81024E+03 | 1.55613E+03 | 8.88647E+02 | 3.59913E+00 | −2.06558E−04 |
| L | −3.81782E+03 | −8.54275E+02 | −3.93336E+02 | −7.63130E−01 | 6.32329E−06 |
| M | 7.33648E+02 | 3.13965E+02 | 1.15866E+02 | 1.06507E−01 | 0.00000E+00 |
| N | 0.00000E+00 | −6.91879E+01 | −2.03461E+01 | −8.80295E−03 | 0.00000E+00 |
| O | 0.00000E+00 | 6.89951E+00 | 1.60865E+00 | 3.26436E−04 | 0.00000E+00 |

Figure 12:
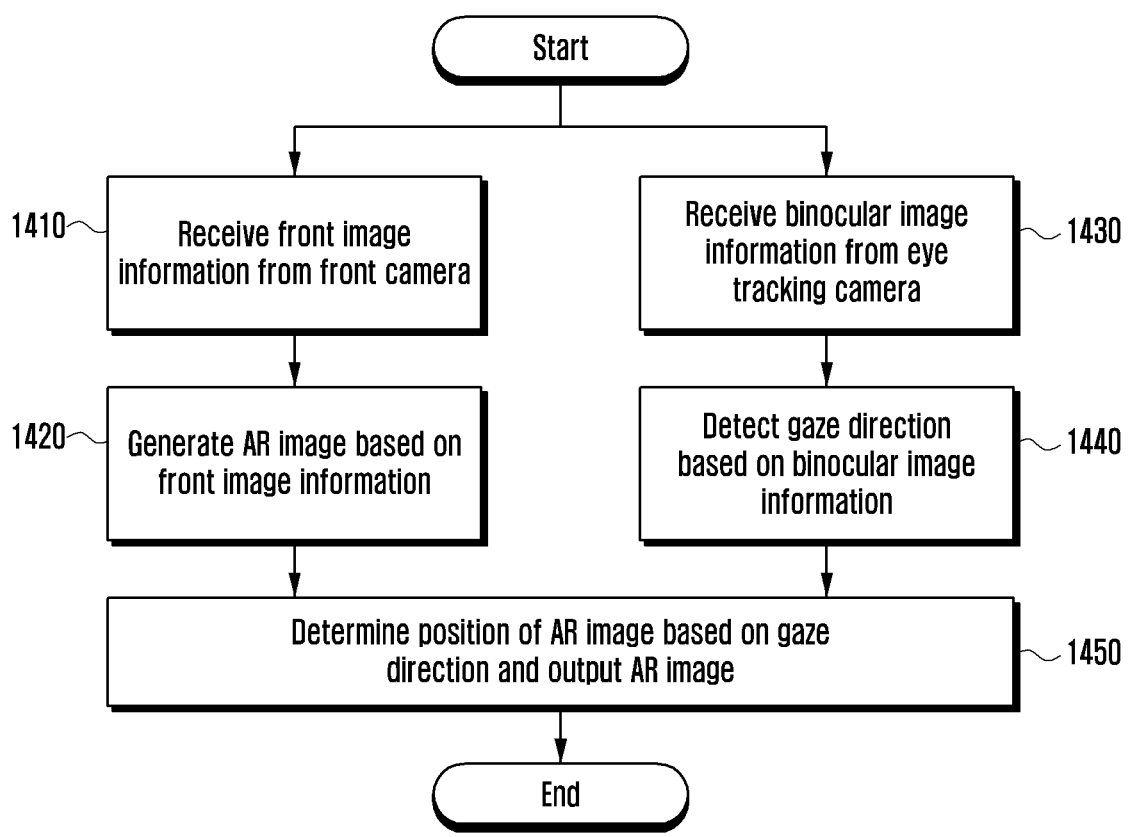
FIG. 12 is a flowchart illustrating an example operation for tracking gaze of a user of an electronic device and providing an AR environment according to various embodiments.

FIG. 12 is a flowchart illustrating an example operation for tracking gaze of a user of an electronic device and providing an AR environment according to various embodiments.

Each operation of FIG. 12 may represent an operation of the processor (e.g., the processor 120 of FIG. 1 and/or the processor 540 of FIG. 5) included in an electronic device (e.g., the electronic device 101 of FIGS. 1, 2A, 2B and 3, and/or the electronic device 500 of FIG. 5) for tracking a user's gaze and providing an AR service.

With reference to operation 1410, the processor 540 may receive front image information from the front camera (e.g., the front camera 520 of FIG. 5). The front camera 520 may photograph an object existing in front of the electronic device 500, for example, in front of a frame (e.g., the frame 223 of FIG. 2A), and generate front image information on the photographed image. The processor 540 may recognize an object existing in front of the frame using the front image information, and track the user's hand or the object existing in front of the frame.

With reference to operation 1420, the processor 540 may generate an AR image based on front image information. The processor 540 may analyze the front image information to recognize an object existing in the front, and generate a virtual object corresponding to the object existing in the front. The processor 540 may generate an AR image including a virtual object.

With reference to operation 1430, the processor 540 may receive binocular image information from the eye tracking camera 510. The eye tracking camera 510 may photograph the rear of the electronic device 500, for example, a rear direction of the frame (e.g., the frame 223 of FIG. 2A), and photograph both eyes of a user wearing the electronic device. The processor 540 may receive binocular image information generated by at least partially photographing both eyes of the user including a left eye and a right eye of the user wearing the electronic device 500 from the eye tracking camera 510.

With reference to operation 1440, the processor 540 may detect a gaze direction based on binocular image information. According to various embodiments, the processor 540 may track a pupil movement of the user using the binocular image information. According to various embodiments, the processor 540 may track the user's pupil movement through the binocular image information to obtain the user's gaze direction.

With reference to operation 1450, the processor 540 may determine a position of the AR image based on the gaze direction and output the AR image. According to various embodiments, the processor 540 may control the display module 530 to project light onto a glass module (e.g., the first glass 220 and/or the second glass 230 of FIG. 2A), thereby enabling to output an AR image. According to various embodiments, the processor 540 may control the display module 530 to output a generated AR image. When an AR image is output from the display module 530 and projected on the glass module, the virtual object included in the AR image may be combined with visible light of the front applied through the glass module to implement AR.

According to various embodiments, the processor 540 may determine a position of the AR image based on the gaze direction. For example, the processor 540 may control the display module 530 so that the user's gaze direction and the center of the image projected on the glass module (e.g., the first glass 220 and/or the second glass 230 of FIG. 2A) coincide with each other. In an embodiment, the processor 540 may control the display module 530 to adjust a resolution of an AR image corresponding to a certain region based on the user's gaze direction to be higher than that of the other region. In an embodiment, the processor 540 may output an AR image such that the AR object is positioned in a certain region based on the user's gaze direction. In an embodiment, the processor 540 may change and output a position of the output AR image based on the gaze direction. Further, the processor may control the display module in various ways or generate an AR image using the gaze direction obtained through the binocular image information.

An electronic device according to various example embodiments of the disclosure includes: a frame; a glass module comprising a glass supported by the frame; a support rotatably connected to the frame; a display module comprising display circuitry configured to project an image to the glass module; a front camera disposed in at least one of the frame or the support and configured to photograph the front of the frame; a light emitting unit comprising light-emitting circuitry configured to radiate light toward the rear of the frame; and an eye tracking camera disposed in the frame and configured to photograph the rear of the frame and including a lens assembly including at least one lens, wherein the eye tracking camera is configured to form a field of view (FOV) to include both a left eye and a right eye of a user based on an object distance, which is a distance between the lens assembly and an object, being a first distance corresponding to a distance between the lens assembly and the left eye and/or the right eye of the user wearing the electronic device, wherein an absolute value of a distortion value of the lens assembly is equal to or less than a threshold value capable of tracking a pupil movement of the left eye and the right eye with respect to light incident from a region of interest (ROI) within a certain range from an outermost portion to the inside among regions corresponding to the FOV.

Further, the glass module may include: a first glass and a second glass, the first glass and the second glass may be disposed at positions corresponding to the left eye and the right eye, respectively, of the user when worn by the user, and wherein the eye tracking camera may be disposed at a position between the first glass and the second glass on the frame.

Further, the lens assembly may include a plurality of lenses, and the plurality of lenses may be disposed to sequentially stack in an incident direction of the incident light.

Further, an outermost lens disposed at an outermost portion of the plurality of lenses may include a glass material.

Further, the plurality of lenses may be disposed such that an absolute value of a distortion value of the lens assembly is equal to or less than the threshold value with respect to light incident from the ROI.

Further, the ROI may include a region corresponding to a pupil of the user's left eye and a pupil of the user's right eye.

Further, based on the FOV being formed in a range of −1.0 F (field) to 1.0 F, the ROI may include a region corresponding to a range of −0.9 F to −0.5 F and/or 0.5 F to 0.9 F.

Further, the distortion value of the lens assembly may have a positive value.

Further, the threshold value may be 3.0% or less.

Further, the electronic device may further include: a processor operatively connected to the display module, the front camera, and the eye tracking camera, wherein the processor may be configured to: generate front image information by receiving light incident from the front of the frame by the front camera, and to generate binocular image information including image information of the left eye and image information of the right eye by receiving light incident on the lens assembly by the eye tracking camera.

Further, the processor may be configured to: receive front image information from the front camera, generate an AR image based on the front image information, receive the binocular image information from the eye tracking camera, detect a gaze direction based on the binocular image information, determine a position of the AR image based on the gaze direction, and output an AR image at the determined position.

Further, the processor may be configured to adjust a resolution of the AR image based on the gaze direction.

Further, the processor may be configured to adjust a position of an object included in the AR image based on the gaze direction.

Further, the FOV may be formed at 110° to 130°.

Further, based on the object distance being formed at 20 to 35 mm, the FOV of the lens assembly may be formed at 120° or more.

Further, light radiated by the light emitting unit may include at least one of visible light or infrared light.

A method of tracking a gaze of a user of an electronic device and outputting an AR image according to various example embodiments of the disclosure includes: generating front image information by receiving light incident from the front; and generating binocular image information including image information of the left eye and image information of the right eye by receiving light incident from the user's left eye and right eye directions using an eye tracking camera, wherein the eye tracking camera forms a field of view (FOV) including all the user's left eye and right eye based on an object distance between an object and the lens assembly included therein being a distance corresponding to a distance between the left eye and/or the right eye of the user wearing the electronic device, an absolute value of a distortion value of the lens assembly is equal to or less than a threshold value capable of tracking a pupil movement of the left eye and the right eye with respect to light incident from a region of interest (ROI) within a certain range from an outermost portion to the inside among regions corresponding to the FOV.

Further, the method may further include: generating an AR image based on the front image information; detecting a gaze direction based on the binocular image information; determining a position of the AR image based on the gaze direction; and outputting the AR image to the determined position.

The method may further include partially adjusting a resolution of the AR image based on the gaze direction.

The method may further include adjusting a position of the object included in the AR image based on the gaze direction.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a frame;
a glass module including at least one glass supported by the frame;
a support rotatably connected to the frame;
a display module comprising display circuitry configured to project an image to the glass module;
a front camera disposed in at least one of the frame or the support to photograph the front of the frame;
a light emitting unit comprising light-emitting circuitry configured to radiate light toward the rear of the frame; and
an eye tracking camera disposed in the frame configured to photograph the rear of the frame and including a lens assembly including at least one lens,
wherein the eye tracking camera is configured to form a field of view (FOV) to include both a left eye and a right eye of a user based on an object distance, which is a distance between the lens assembly and an object, being a first distance corresponding to a distance between the lens assembly and the left eye and/or the right eye of the user wearing the electronic device, and
wherein an absolute value of a distortion value of the lens assembly is equal to or less than a threshold value capable of tracking a pupil movement of the left eye and the right eye with respect to light incident from a region of interest (ROI) within a certain range from an outermost portion to the inside among regions corresponding to the FOV.

2. The electronic device of claim 1, wherein the glass module comprises a first glass and a second glass,
the first glass and the second glass are disposed at positions corresponding to the left eye and the right eye, respectively, of the user when the electronic device is worn by the user, and
the eye tracking camera is disposed at a position between the first glass and the second glass on the frame.

3. The electronic device of claim 1, wherein the lens assembly comprises a plurality of lenses, and
the plurality of lenses are disposed to sequentially stack in an incident direction of the incident light.

4. The electronic device of claim 3, wherein an outermost lens disposed at an outermost portion of the plurality of lenses comprises a glass material.

5. The electronic device of claim 1, wherein the plurality of lenses are disposed such that an absolute value of a distortion value of the lens assembly is equal to or less than the threshold value with respect to light incident from the ROI.

6. The electronic device of claim 1, wherein the ROI comprises a region corresponding to a pupil of the user's left eye and a pupil of the user's right eye.

7. The electronic device of claim 1, wherein the ROI comprises a region corresponding to a range of −0.9 F to −0.5 F and/or 0.5 F to 0.9 F based on the FOV being formed in a range of −1.0 F (field) to 1.0 F.

8. The electronic device of claim 1, wherein the distortion value of the lens assembly has a positive value.

9. The electronic device of claim 1, wherein the threshold value is 3.0% or less.

10. The electronic device of claim 1, further comprising a processor operatively connected to the display module, the front camera, and the eye tracking camera,
wherein the processor is configured to:
generate front image information by receiving light incident from the front of the frame by the front camera, and
generate binocular image information including image information of the left eye and image information of the right eye by receiving light incident on the lens assembly by the eye tracking camera.

11. The electronic device of claim 10, wherein the processor is configured to:
receive front image information from the front camera,
generate an augmented reality (AR) image based on the front image information,
receive the binocular image information from the eye tracking camera,
detect a gaze direction based on the binocular image information,
determine a position of the AR image based on the gaze direction, and
output an AR image at the determined position.

12. The electronic device of claim 11, wherein the processor is configured to adjust a resolution of the AR image based on the gaze direction.

13. The electronic device of claim 11, wherein the processor is configured to adjust a position of an object included in the AR image based on the gaze direction.

14. The electronic device of claim 1, wherein the FOV is formed at 110° to 130°.

15. The electronic device of claim 1, wherein the FOV of the lens assembly is formed at 120° or more when the object distance is formed at 20 to 35 mm.

16. The electronic device of claim 1, wherein light radiated by the light emitting unit comprises at least one of visible light or infrared light.

17. A method of tracking gaze of a user of an electronic device and outputting an augmented reality (AR) image, the method comprising:
generating front image information by receiving light incident from the front; and
generating binocular image information including image information of a left eye and image information of a right eye by receiving light incident from the user's left eye and right eye directions using an eye tracking camera,
wherein the eye tracking camera forms a field of view (FOV) including all the user's left eye and right eye based on an object distance between an object and the lens assembly included therein being a distance corresponding to a distance between the left eye and/or the right eye of the user wearing the electronic device, and
an absolute value of a distortion value of the lens assembly is equal to or less than a threshold value capable of tracking a pupil movement of the left eye and the right eye with respect to light incident from a region of interest (ROI) within a certain range from an outermost portion to the inside among regions corresponding to the FOV.

18. The method of claim 17, further comprising:
generating an AR image based on the front image information;
detecting a gaze direction based on binocular image information;
determining a position of the AR image based on the gaze direction; and
outputting the AR image to the determined position.

19. The method of claim 18, further comprising partially adjusting a resolution of the AR image based on the gaze direction.

20. The method of claim 18, further comprising adjusting a position of the object included in the AR image based on the gaze direction.

* * * * *